United States Patent
Princehouse et al.

(10) Patent No.: US 11,934,409 B2
(45) Date of Patent: Mar. 19, 2024

(54) CONTINUOUS FUNCTIONS IN A TIME-SERIES DATABASE

(71) Applicant: Amazon Technologies, Inc., Seattle, WA (US)

(72) Inventors: Lonnie J. Princehouse, Seattle, WA (US); Timothy A. Rath, Olympia, WA (US); Gaurav Gupta, Sammamish, WA (US); Mustafa Ozan Ozen, Vancouver (CA); Omer Ahmed Zaki, Bellevue, WA (US); Karthik Gurumoorthy Subramanya Bharathy, Sammamish, WA (US); Gaurav Saxena, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/199,102

(22) Filed: Nov. 23, 2018

(65) Prior Publication Data

US 2020/0167361 A1    May 28, 2020

(51) Int. Cl.
*G06F 16/00*    (2019.01)
*G06F 3/06*    (2006.01)
(Continued)

(52) U.S. Cl.
CPC ...... *G06F 16/24568* (2019.01); *G06F 3/0607* (2013.01); *G06F 3/0644* (2013.01);
(Continued)

(58) Field of Classification Search
CPC ............. G06F 16/24568; G06F 3/0607; G06F 3/0644; G06F 3/067; G06F 16/248;
(Continued)

(56) References Cited

U.S. PATENT DOCUMENTS

| | | |
|---|---|---|
| 5,765,171 A | 6/1998 | Gehani et al. |
| 6,256,634 B1 | 7/2001 | Moshaiov et al. |

(Continued)

FOREIGN PATENT DOCUMENTS

WO    2015070232    5/2015

OTHER PUBLICATIONS

Arvind Thiagarajan et al, 2008, "Querying continuous functions in a database system", in Proceedings of the 2008 ACM SIGMOD international conference on Management of data (SIGMOD '08). Association for Computing Machinery, New York, NY, USA, 791-804 (Year: 2008).*

(Continued)

*Primary Examiner* — Paul Kim
(74) *Attorney, Agent, or Firm* — Robert C. Kowert; Kowert, Hood, Munyon, Rankin & Goetzel, P.C.

(57) ABSTRACT

Methods, systems, and computer-readable media for continuous functions in a time-series database are disclosed. A plurality of data points of a time series are stored into one or more storage tiers of a time-series database. The plurality of data points comprise a plurality of discrete measurements at respective timestamps. Using one or more query processors of the time-series database, a query of the time series is initiated. The query indicates a time range. Using the one or more query processors, a continuous function is determined that represents a segment of the time series in the time range. The continuous function is determined based at least in part on the plurality of data points. An operation is performed using the continuous function as an input.

20 Claims, 18 Drawing Sheets

(51) Int. Cl.
*G06F 16/2455* (2019.01)
*G06F 16/248* (2019.01)
*G06F 16/27* (2019.01)

(52) U.S. Cl.
CPC ............ *G06F 3/067* (2013.01); *G06F 16/248* (2019.01); *G06F 16/278* (2019.01)

(58) Field of Classification Search
CPC ...... G06F 16/278; G06F 3/061; G06F 3/0649; G06F 3/0659; G06F 3/0685; G06F 16/285
See application file for complete search history.

(56) References Cited

U.S. PATENT DOCUMENTS

| | | |
|---|---|---|
| 7,519,734 B1 | 4/2009 | Dumitriu et al. |
| 7,779,025 B2 | 8/2010 | Gunawardena et al. |
| 8,132,046 B2 | 3/2012 | Varghese |
| 8,219,581 B2* | 7/2012 | Roy .................... G06F 16/2474 707/770 |
| 8,276,154 B2 | 9/2012 | Toub et al. |
| 8,335,765 B2 | 12/2012 | Sivasubramanian et al. |
| 8,386,540 B1 | 2/2013 | McAlister et al. |
| 8,595,547 B1 | 11/2013 | Sivasubramanian et al. |
| 8,601,112 B1 | 12/2013 | Nordstrom et al. |
| 8,676,851 B1 | 3/2014 | Nesbit |
| 8,930,312 B1 | 1/2015 | Rath |
| 8,965,849 B1 | 2/2015 | Goo |
| 9,069,827 B1 | 6/2015 | Rath |
| 9,128,965 B1 | 9/2015 | Yanacek et al. |
| 9,286,001 B2 | 3/2016 | Skjolsvold et al. |
| 9,449,122 B2 | 9/2016 | Haas et al. |
| 9,514,199 B1 | 12/2016 | Deprey et al. |
| 9,607,019 B1 | 3/2017 | Swift et al. |
| 9,607,067 B2 | 3/2017 | Haas et al. |
| 9,626,374 B2 | 4/2017 | Hirsch et al. |
| 9,672,257 B2 | 6/2017 | Tobin et al. |
| 9,773,015 B2 | 9/2017 | Guo et al. |
| 9,817,727 B2 | 11/2017 | McAlister et al. |
| 9,836,492 B1 | 12/2017 | Hermanson |
| 9,934,107 B1 | 4/2018 | Chikkanayakanahally et al. |
| 10,007,513 B2 | 6/2018 | Malladi et al. |
| 10,459,827 B1 | 10/2019 | Aghdaie et al. |
| 10,776,355 B1 | 9/2020 | Batsakis et al. |
| 10,997,137 B1 | 5/2021 | Goyal et al. |
| 11,068,537 B1 | 7/2021 | Goyal et al. |
| 11,216,487 B1 | 1/2022 | Goyal et al. |
| 11,250,019 B1 | 2/2022 | Goyal et al. |
| 11,256,719 B1 | 2/2022 | Saxena et al. |
| 11,258,683 B2 | 2/2022 | Park |
| 11,263,184 B1 | 3/2022 | Ozen et al. |
| 11,409,725 B1 | 8/2022 | Goyal |
| 11,513,854 B1 | 11/2022 | Saxena et al. |
| 11,537,619 B1 | 12/2022 | Goyal |
| 11,573,981 B1 | 2/2023 | Goyal et al. |
| 2004/0133590 A1 | 7/2004 | Henderson et al. |
| 2008/0052322 A1 | 2/2008 | Gusciora |
| 2010/0121817 A1 | 5/2010 | Meyer et al. |
| 2010/0153953 A1 | 6/2010 | Adl-Tabatabai |
| 2011/0282836 A1 | 11/2011 | Erickson et al. |
| 2014/0067810 A1 | 3/2014 | Wisnovsky |
| 2014/0122434 A1 | 5/2014 | Knight et al. |
| 2014/0236890 A1 | 8/2014 | Vasan |
| 2015/0134626 A1 | 5/2015 | Theimer |
| 2015/0134795 A1 | 5/2015 | Theimer et al. |
| 2015/0134796 A1 | 5/2015 | Theimer et al. |
| 2015/0135255 A1 | 5/2015 | Theimer et al. |
| 2015/0149413 A1 | 5/2015 | Lee |
| 2015/0293955 A1 | 10/2015 | Dickey |
| 2016/0062837 A1 | 3/2016 | Slik |
| 2016/0328432 A1 | 11/2016 | Raghunathan |
| 2016/0334998 A1 | 11/2016 | George et al. |
| 2016/0357828 A1 | 12/2016 | Tobin et al. |
| 2017/0060574 A1 | 3/2017 | Malladi et al. |
| 2017/0103103 A1* | 4/2017 | Nixon ................ G06F 16/2452 |
| 2017/0177546 A1* | 6/2017 | Heinz .................. G06T 11/206 |
| 2017/0177646 A1 | 6/2017 | Chen et al. |
| 2017/0228257 A1 | 8/2017 | Dong et al. |
| 2017/0286486 A1* | 10/2017 | Pang .................. G06F 16/2477 |
| 2017/0286499 A1 | 10/2017 | Bingham et al. |
| 2018/0089328 A1 | 3/2018 | Bath |
| 2018/0332367 A1 | 5/2018 | Kaitchuck |
| 2018/0189337 A1 | 7/2018 | Milby |
| 2018/0232422 A1 | 8/2018 | Park et al. |
| 2018/0246934 A1 | 8/2018 | Arye et al. |
| 2018/0316568 A1 | 11/2018 | Gill |
| 2019/0050453 A1 | 2/2019 | Duffield et al. |
| 2019/0065278 A1 | 2/2019 | Jeuk et al. |
| 2019/0095241 A1 | 3/2019 | Ago et al. |
| 2019/0146849 A1 | 5/2019 | Leonard et al. |
| 2019/0171748 A1 | 6/2019 | Duffield |
| 2019/0197179 A1 | 6/2019 | Spratt |
| 2019/0236149 A1 | 8/2019 | Kuruvada |
| 2019/0250819 A1 | 8/2019 | Jain et al. |
| 2019/0310919 A1 | 10/2019 | Natanzon et al. |
| 2020/0167360 A1 | 5/2020 | Rath |
| 2020/0167361 A1 | 5/2020 | Princehouse |
| 2022/0121684 A1 | 4/2022 | Goyal et al. |
| 2022/0374407 A1 | 11/2022 | Goyal et al. |

OTHER PUBLICATIONS

U.S. Appl. No. 16/199,078, filed Nov. 23, 2018, Timothy A. Rath.
U.S. Appl. No. 16/199,103, filed Nov. 23, 2018, Timothy A. Rath.
U.S. Appl. No. 16/357,224, filed Mar. 18, 2019, Dumanshu Goyal.
Anonymous, "Amazon Kinesis Streams: Developer Guide", Dated Nov. 16, 2017, pp. 1-143.
Anonymous, Amazon Kinesis Firehose: Developer Guide, dated Oct. 25, 2017, p. 1-66.
U.S. Appl. No. 17/349,786, dated Jun. 16, 2021, Sudipto Das.
U.S. Appl. No. 17/349,790, dated Jun. 16, 2021, Sudipto Das.
U.S. Appl. No. 17/234,372, dated Apr. 19, 2021, Evgeniy Retyunskiy.
U.S. Appl. No. 16/008,940, filed Jun. 14, 2018, Rajneesh Kumar.
U.S. Appl. No. 16/219,686, filed Dec. 13, 2018, Dumanshu Goyal.

* cited by examiner

CONTINUOUS FUNCTIONS IN A TIME-SERIES DATABASE

BACKGROUND

This application is related to U.S. patent Application Ser. No. 16,199,078, titled "SCALABLE ARCHITECTURE FOR A DISTRIBUTED TIME-SERIES DATABASE," filed Nov. 23, 2018, and having inventors Omer Ahmed Zaki, Gaurav Gupta, Timothy A. Rath, and Mustafa Ozan Ozen, and which is hereby incorporated by reference herein in its entirety.

This application is related to U.S. patent application Ser. No. 16/199,103, titled "EDGE PROCESSING IN A DISTRIBUTED TIME-SERIES DATABASE," filed Nov. 23, 2018, and having inventors Omer Ahmed Zaki, Gaurav Gupta, Timothy A. Rath, and Mustafa Ozan Ozen, and which is hereby incorporated by reference herein in its entirety.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services or systems that interact with clients. For example, such distributed systems may provide database systems to clients. As the scale and scope of database systems have increased, the tasks of provisioning, administering, and managing system resources have become increasingly complicated. For example, the costs to search, analyze, and otherwise manage data sets can increase with the size and scale of the data sets.

Figure 1:
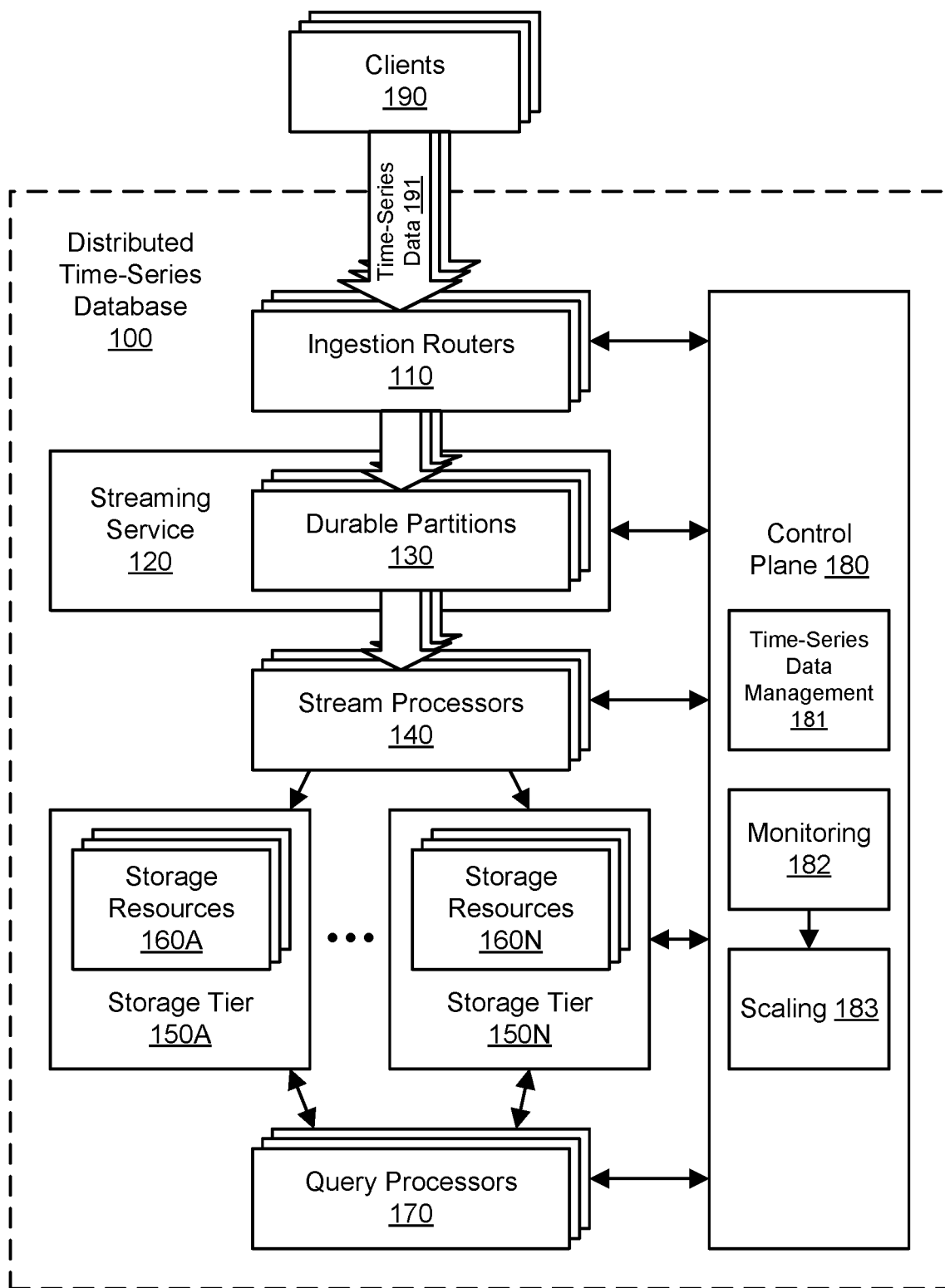
FIG. 1 illustrates an example system environment for a scalable architecture for a distributed time-series database, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Embodiments of methods, systems, and computer-readable media for a scalable architecture for a distributed time-series database are described. A distributed time-series database may include a plurality of stages (or layers), and different stages may be scaled up or down independently of other stages. In various embodiments, the database may include a scalable fleet of ingestion routers, a scalable set of durable partitions, a scalable fleet of stream processors, a plurality of storage tiers having scalable storage resources, and/or a scalable set of query processors. Time-series data from client devices (e.g., measurements generated over time) may be received by the ingestion routers and partitioned into the durable partitions. The durable partitions may be maintained by a streaming service. The stream processors may read time-series data from the durable partitions and store the data in tables in various storage tiers. For example, the time-series data may be stored into a "hot" tier representing lower-latency storage but a shorter retention period and also into a "cold" tier representing higher-latency storage but a longer retention period. The query processors may then perform queries using the time-series data stored in one or more of the storage tiers. In various embodiments, the size of the ingestion fleet, durable partitions, stream processor fleet, and storage tiers may vary based on the rate or amount of the time-series data, and the size of the query processor fleet may vary based on the rate or amount of queries. Decoupling of the various stages from each other may permit a stage to be scaled independently of other stages. A control plane may initiate automated upscaling or downscaling at a stage based (at least in part) on the observed or anticipated rate or amount of time-series data (e.g., the ingestion rate at the ingestion fleet), the query volume, performance metrics of various components, and so on. Using the techniques described herein, a distributed time-series database may scale for efficient processing, storage, and querying of potentially very large amounts of time-based data from a potentially large set of clients.

Embodiments of methods, systems, and computer-readable media for continuous functions in a time-series database are described. Time-series data from client devices (e.g., measurements generated over time) may be received by a time-series database and stored in one or more storage tiers. The time-series data in the storage tier(s) may be available for queries performed by a fleet of query processors. A time series may include a sequence of data points representing different points in time. A data point may include a measurement and a timestamp. Any given contiguous subset of such data points may represent a segment of the time series. As received and stored by the time-series database, a time series may thus represent a sequence of discrete data points that define different values for a measurement at a finite number of points in time. In one embodiment, the time-series database may interpret a segment of such discrete measurements as a continuous one-dimensional function. Using the continuous function to represent a segment of the time series, the measurement may be defined at every potential point in time within a particular time range. The continuous function may then be used as input to other operations, such as mathematical functions, that expect a one-dimensional function as input. For example, the time-series database may calculate the derivative or integral of a time-series segment using a continuous function. Multiple continuous functions may be used as inputs to such an operation even if the underlying data points exist at different frequencies in the raw data sets and are thus not aligned. In one embodiment, the time-series database may support a query language for queries of the time-series data. Continuous functions representing time-series segments may represent first-class primitives in the query language. For example, a query may specify the time series to be queried, the time range to be queried, a technique for interpreting the discrete data points as a continuous function (e.g., using linear interpolation, spline interpolation, and so on), and potentially an operation to be performed using the resulting continuous function as input. In generating a continuous function, data points may be adaptively sampled to meet an error tolerance. A continuous function may be converted back to a discrete set of data points. Using the techniques described herein, a distributed time-series database may facilitate complex operations on time-series segments by using continuous functions to represent the segments.

Embodiments of methods, systems, and computer-readable media for edge processing in a distributed time-series database are described. A distributed time-series database may include both local and remote components, such as components at one or more client premises or other edge locations along with components in a network-accessible cloud-based environment. The database may implement various stages using ingestion routers, durable partitions, stream processors, a plurality of storage tiers, and/or query processors. In various embodiments, aspects of one or more of the stages may be implemented both locally and remotely. In some embodiments, various local time-series databases operated by or on behalf of different clients may interact with the same remote time-series database in the cloud. A unified control plane may be used for management of both local and remote components. Time-series data (e.g., measurements generated over time) may be stored locally, e.g., in a local storage tier, before being sent to the cloud-based time-series database. Time-series data may be processed locally to produce aggregations, summaries, downsampled data sets, and/or other transformations, and such derived data may be sent to the cloud-based time-series database. Time-series data may be queried from the local storage tier(s) and/or the remote storage tier(s). By placing the functionality of a time-series database closer to clients, clients may react more quickly to changes in measurements. For example, if a local time-series database detects that a new measurement exceeds a threshold, then action may be taken locally in response to that measurement without having to send the time-series-data to the cloud and wait for analysis to be performed remotely. Using the techniques described herein, a distributed time-series database may expedite the use of time-series data by reducing a reliance on a cloud-based portion of the system.

As one skilled in the art will appreciate in light of this disclosure, embodiments may be capable of achieving certain technical advantages, including some or all of the following: (1) improving the scalability of a distributed database by decoupling various stages of the database, such as ingestion and storage; (2) improving the availability of a distributed database by automated scaling of various components without taking the database offline; (3) reducing the amount of idle computational resources of a distributed database by automated scaling of components; (4) reducing the amount of idle storage resources of a distributed database by automated scaling of components; (5) improving the performance of queries by storing data according to a hierarchy of time series such that retrieval of the data is faster; (6) improving the performance of queries by maintaining more recent data in a storage tier having a lower latency of storage and retrieval; (7) improving the long-term availability of data for queries by maintaining older data in a storage tier having a higher latency of storage and retrieval; (8) reducing the complexity of performing mathematical functions and other operations on time-series segments by using continuous functions to represent the segments; (9) reducing the number of queries or user tasks in performing operations on multiple time-series segments with misaligned timestamps by using continuous functions to represent the segments; (10) reducing the latency of analysis of time-series data by performing the analysis locally, e.g., at or near client premises; (11) reducing the use of network resources by aggregating, downsampling, or compressing time-series data before sending the data to a cloud-based database; (12) reducing the use of cloud-based storage resources by aggregating, downsampling, or compressing time-series data before sending the data to a cloud-based database; and so on.

FIG. 1 illustrates an example system environment for a scalable architecture for a distributed time-series database, according to one embodiment. A distributed time-series database 100 may ingest and store time-series data 191 and make the stored data available for queries. Elements of the time-series data 191 may be received by the database 100 from clients 190 over time, e.g., as one or more streams of time-series data. Clients 190 may represent various types of client devices that generate or otherwise provide data in various time series to the database 100. A time series may include a set of values that change over time, such as sensor measurements or system metrics, and that are timestamped or otherwise positioned along a temporal axis. For example, a set of client devices 190 may repeatedly gather information such as vibration, temperature, and pressure using sensors. As another example, a set of client devices 190 may detect state transitions, e.g., in a computer network. Client devices 190 that provide the time-series data 191 to the database 100 may be associated with various domains such as Internet of Things (IoT) and "smart home" networks, autonomous vehicles, manufacturing facilities, distribution facilities, computational resources in a multi-tenant provider network, facilities management systems, stock trading systems, and so on. Some time series or hierarchies of time series may include very large numbers of measurements. For example, a multi-tenant provider network may monitor trillions of events per day. As another example, a fulfillment center for an online store may have thousands of sensors that monitor the state of equipment, goods, and software. In order to efficiently ingest, transform, store, and/or query such large quantities of data, the distributed database 100 may employ scaling techniques while keeping the database online for continued ingestion and querying. By decoupling various stages of the distributed database 100 from each other, individual portions of the database may be scaled up or down by a control plane 180 to make better use of computational and storage resources while permitting near-real-time ingestion and querying of time-series data.

The ingested time-series data 191 may represent a large number of individual time series. An individual time series may include a sequence of values or observations (e.g., for a feature of a system or a phenomenon) that can be plotted over time. An individual time series may be uniquely identified by a set of dimensions such as what the observations are measuring, where the observations were measured, client-specified tags such as device model or instance type, and so on. For example, a smart-home device may produce a time series representing measurements of humidity in a particular room at a particular address. The same device may also produce other time series representing measurements at the same location for temperature, dust levels, carbon dioxide, and so on. As another example, a virtual compute instance in a multi-tenant provider network may emit a time series representing CPU utilization over time, another time series representing disk reads over time, yet another time series representing network packets received over time, and so on. Because developers often operate on related time series together, time series that are related (e.g., by physical proximity, by being generated by the same device, and so on) may be clustered using the database 100 for efficient storage and retrieval. To enable such applications, the database 100 may offer a query language that provides filtering according to dimensions such as the device model, instance type, region, address, location, and so on. In one embodiment, any change to such a dimension may produce a new time series in the distributed database 100. In one embodiment, given a measure name and a set of dimensions, a time series may be identified using the following notation: <measure name> {<dimension name>=<dimension value>, . . . }. For example, a time series with a measure CarBatteryCharge and dimensions model="carX" and VIN="ABC" may be expressed as CarBatteryCharge {model="carX", VIN="ABC"}.

The database 100 may manage a large amount of time-series data throughout the lifecycle of the data. The times-series data 191 may be received at the database 100 using a fleet of ingestion routers 110. The time-series data may typically arrive at the database 100 in time order, but the database may be able to ingest out-of-order data as well. The ingestion routers 110 may divide the data 191 from the clients 190 into non-overlapping partitions 130. In one embodiment, the ingested data may be spatially partitioned along non-overlapping spatial boundaries according to the time series or range of the data, one or more tags associated with the data, the region that produced the data, the category to which the data belongs, and/or other suitable metadata. As will be discussed in greater detail below, ingested time-series data may be mapped to different partitions based on hierarchical clustering in order to achieve better performance of data storage and retrieval. A partition may include one time series or multiple time series. The partitions 130 may be maintained using persistent storage resources and may be termed durable partitions. In various embodiments, the durable partitions 130 may be provided by a streaming service 120 or by a durable data store. The streaming service 120 may use shards or other divisions to implement the non-overlapping partitions 130. The streaming service 120 or control plane 180 may dynamically increase or decrease the number of partitions based (at least in part) on the amount or rate of ingestion of time-series data. Similarly, the control plane 180 may dynamically increase or decrease the number of ingestion routers 110 based (at least in part) on the amount or rate of ingestion of time-series data. The use of the durable partitions 130 as a staging area may permit the database 100 to decouple ingestion from stream processing and storage. Acknowledgements of requests to add time-series data elements may be sent to the clients 190 upon the successful addition of time-series data elements to the partitions 130.

A fleet of stream processors 140 may take the time-series data from the durable partitions 140, potentially process the data in various ways, and add the data to one or more storage tiers 150A-150N. For example, one stream processor may write data from one partition to a "hot" storage tier, and another stream processor may write data from the same partition to a "cold" storage tier. As another example, a stream processor may create materialized views or derived tables based on a partition, such as an aggregation or rollup of a time interval. In various embodiments, stream processors may perform reordering, deduplication, aggregation of different time periods, and other transformations on time series data. The data 191 may be routed from the durable partitions 130 to the stream processors 140 according to routing metadata, e.g., that maps different time series or ranges of the data to different stream processors. In one embodiment, a given stream processor may be assigned to one and only one partition at a time. In one embodiment, as the number of partitions increases or decreases based on the amount or rate of ingestion, the number of stream processors may also tend to increase or decrease dynamically.

In one embodiment, the stream processors 140 may organize the time series in tables. The stream processors 140 may also be referred to as table builders. A table may store one or more time series. A table may be a named entity that stores related time series that are usable by the same application. A data point in a time series may be stored in a record. Data points may be added to the database 100 using application programming interface (API) calls or other programmatic interfaces. In one embodiment, data points for multiple time series (e.g., for related time series generated by the same client device) with the same timestamp may be added using a single API call. A data point may be associated with a timestamp, one or more dimensions (in name-value pairs) representing characteristics of the time series, and a measure representing a variable whose value is tracked over time. Timestamps may be provided by clients or automatically added upon ingestion. Measures may be identified by names and may have numeric values, string values, or complex values. Measures may be used by the database 100 in generating aggregations such as min, max, average, and count. For example, a time series related to automobiles may be identified by a unique combination of values for dimensions of a vehicle identification number (VIN), country, state, and city, while measures for such a time series may include the battery state and the miles traveled per day. In one embodiment, dimensions may be indexed for use in queries, and queries may specify time intervals and/or dimensions rather than individual measures.

The various storage tiers 150A-150N may represent different use cases for time-series data. The storage tiers 150A-150N may differ in their performance characteristics, durability characteristics, and cost characteristics. For example, the database 100 may include a hot tier (such as tier 150A) that offers the lowest latency by storing recent time-series data in volatile memory resources (e.g., random access memory) across a distributed set of storages nodes. As another example, the database 100 may include a cold tier that offers higher latency (but a lower cost) by storing a longer interval of time-series data using persistent storage resources such as disk drives. The database 100 may include other tiers such as a warm tier that stores recent time-series data in nonvolatile storage resources (e.g., solid-state drives) across a distributed set of storages nodes, a frozen tier that stores even older time-series data in sequential access storage media, and so on. Based on their needs and budgets, users of the time-series database 100 may select and configure one or more of the storage tiers 150A-150N for storage of their time-series data.

In one embodiment, the database 100 may represent a container of tables and policies, such as retention policies. Policies may be applied at the database level for all tables or may be overridden for individual tables. The database 100 may offer a control plane 180 that permits users (e.g., developers of applications) and other systems to perform management and modeling of time series data. For example, using a component for time-series data management 181, the control plane 180 may offer APIs for creating, deleting, and listing tables (or entire databases); describing tables and policies; creating and updating policies and associating policies with tables; listing series within a table; and so on. A retention policy may determine the time interval for which an element of time-series data is kept in a particular tier; beyond that time interval, the time-series data may expire and may be deleted from the tier. Different tiers may differ in their retention policies for time-series data. Tables may also differ in their retention policies. In one embodiment, the database 100 may have default retention periods of three hours for the hot tier and one year for the cold tier. In one embodiment, costs may be assessed to clients for the use of the database 100 to store their time-series data, and the per-measure costs assessed for the hot tier may be greater than the per-measure costs for the cold tier. Accordingly, clients may adjust the retention policies to reach a balance between performance (e.g., query latency) and cost.

The time-series data may be deemed immutable once written to a particular storage tier, e.g., such that new values may be appended to a time series but existing values may not be deleted (except for expiration based on a retention policy). Using a fleet of query processors 170, queries of time-series data may be performed for particular time intervals. The database 100 may enable specialized mathematical functions such as interpolation, approximation, and smoothing to be performed on time-series data, e.g., in order to find trends and patterns. By contrast, traditional relational database management systems may require developers to write complex application code in order to perform such functions. By interacting with the query processors 170, various applications may use the database 100 to perform analysis of time-series data. For example, machine learning and machine vision applications may use time-series data managed by the database 100.

In one embodiment, one or more components of the distributed database 100, such as compute instances and/or storage resources, may be implemented using resources of a provider network. The provider network may represent a network set up by an entity such as a private-sector company or a public-sector organization to provide one or more services (such as various types of network-accessible computing or storage) accessible via the Internet and/or other networks to a distributed set of clients. The provider network may include numerous services that collaborate according to a service-oriented architecture to provide resources such as the ingestion routers 110, durable partitions 130, stream processors 140, storage resources 160A-160N, and/or query processors 170. The provider network may include numerous data centers hosting various resource pools, such as collections of physical and/or virtualized computer servers, storage devices, networking equipment and the like, that are used to implement and distribute the infrastructure and services offered by the provider. Compute resources may be offered by the provider network to clients in units called "instances," such as virtual or physical compute instances. In one embodiment, a virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). In various embodiments, one or more aspects of the distributed database 100 may be implemented as a service of the provider network, the service may be implemented using a plurality of different instances that are distributed throughout one or more networks, and each instance may offer access to the functionality of the service to various clients. Because resources of the provider network may be under the control of multiple clients (or tenants) simultaneously, the provider network may be said to offer multi-tenancy and may be termed a multi-tenant provider network. In one embodiment, portions of the functionality of the provider network, such as the distributed database 100, may be offered to clients in exchange for fees.

In various embodiments, compute resources and/or storage resources at one stage of the database 100 may be scaled up or down in a manner that may be independent of other stages. Using independent scaling at various stages, the stages may be decoupled from one another to provide greater flexibility and more optimal resource usage that adapts to changing conditions (e.g., as time-series data throughput changes). The various stages may include ingestion (using ingestion routers 110), storage in durable partitions 130, stream processing (using stream processors 140), storage in various storage tiers 150A-150N, and query processing (using query processors 170). In one embodiment, the control plane 180 may include a scaling component 183 that manages the scaling of resources at various stages. The scaling 183 may be used to implement the database 100 in a "serverless" manner such that the system itself (e.g., using the control plane 180) automatically manages the amount of resources without particular clients needing to manage the servers and storage instances. In such a serverless system, individual resources may not be owned or managed by individual clients but may instead be managed internally by the database 100 for potential use on behalf of multiple clients.

Scaling may include increasing the amount of resources at a stage or decreasing the amount of resources at a stage. In some embodiments, scaling at particular stages may be a local decision. In some embodiments, scaling at particular stages may be managed by the control plane 180. The control plane 180 may include a monitoring component 182 that obtains data relating to the usage and/or performance of the various stages. For example, the monitoring 182 may determine that the throughput at one or more ingestion routers, stream processors, or query processors exceeds a predetermined threshold and threatens to create a performance bottleneck for the entire database 100. Conversely, the monitoring 182 may determine that one or more ingestion routers, stream processors, or query processors are being underutilized. As another example, the monitoring 182 may determine that the number of durable partitions 130 or the amount of storage resources 160A-160N will be insufficient to meet the storage requirements of the time-series data 191 in the near future. As yet another example, the monitoring 182 may determine that query latency exceeds a threshold and may initiate the addition of more replicas in the hot tier in order to reduce the query latency. The scaling 183 may be performed based on the observed state of the database 100 or based on the anticipated state of the database.

In one embodiment, the scaling 183 may be initiated automatically and based (at least in part) on the monitoring 182. In one embodiment, the scaling 183 may be initiated manually and in response to user input to the control plane 180. In one embodiment, the scaling 183 may increase the amount of compute resources and/or storage resources at a stage by provisioning resources from one or more pools of the provider network. To upscale the resources at a stage, the control plane 180 may interact with a resource manager of the provider network to select appropriate resources (e.g., based on the capabilities of the resources) and reserve those resources for the time-series database 100. To downscale the resources at a stage, the scaling 183 may decrease the amount of compute resources and/or storage resources at the stage by returning resources to one or more pools of the provider network.

Figure 17:
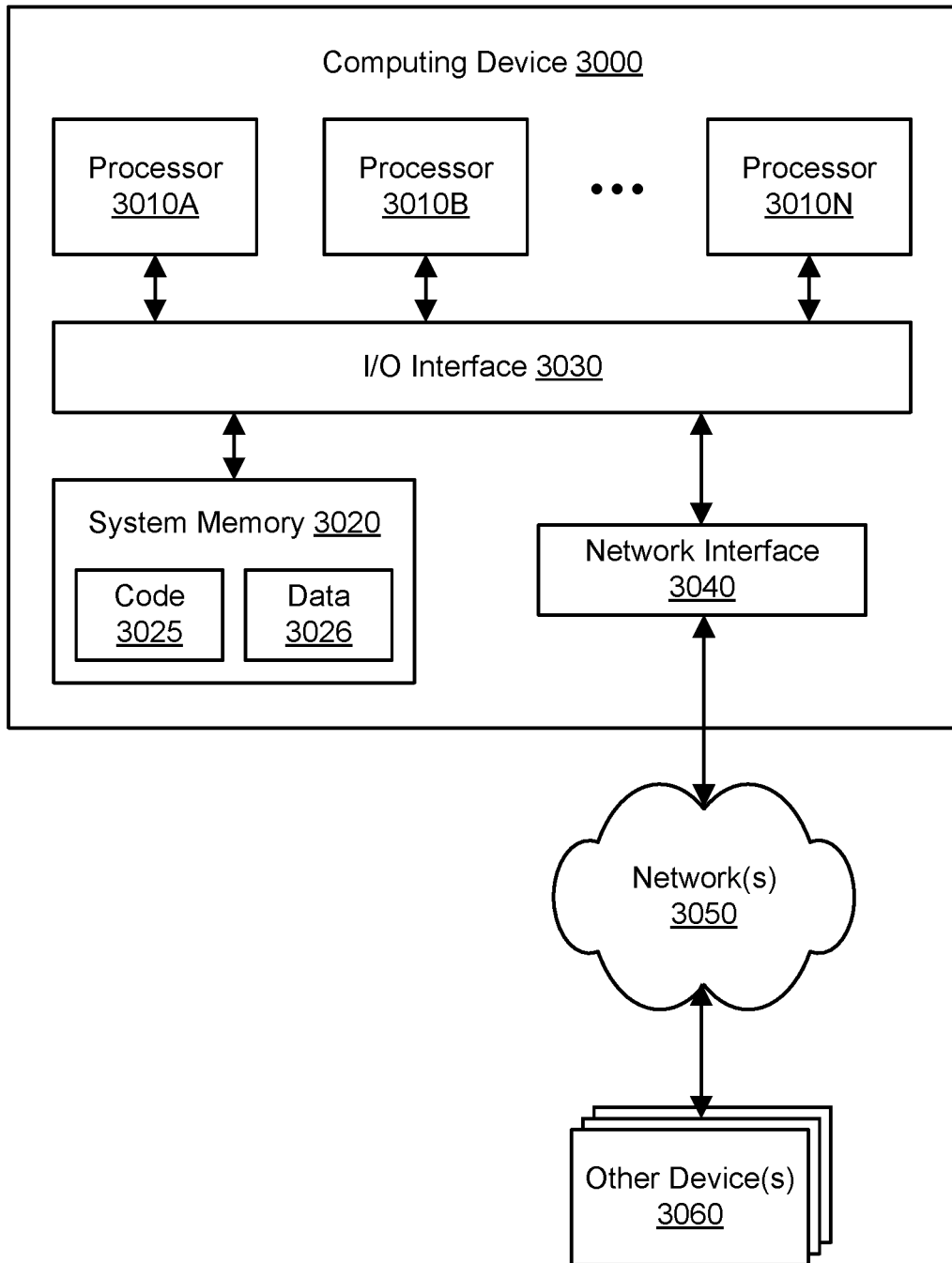
FIG. 17 illustrates an example computing device that may be used in some embodiments.

In various embodiments, components of the distributed database 100, such as the ingestion routers 110, streaming service 120, stream processors 140, storage tiers 150A-150N, query processors 170, and/or control plane 180 may be implemented using any suitable number and configuration of computing devices, any of which may be implemented by the example computing device 3000 illustrated in FIG. 17. In some embodiments, the computing devices may be located in any suitable number of data centers or geographical locations. In various embodiments, at least some of the functionality of the distributed database 100 may be provided by the same computing device or by different computing devices. In various embodiments, if any of the components of the distributed database 100 are implemented using different computing devices, then the components and their respective computing devices may be communicatively coupled, e.g., via one or more networks. Any of the components of the distributed database 100 may represent any combination of software and hardware usable to perform their respective functions. In some embodiments, operations implemented by the distributed database 100 may be performed automatically, e.g., without a need for user initiation or user intervention after an initial configuration stage, and/or programmatically, e.g., by execution of program instructions on at least one computing device. In some embodiments, the distributed database 100 may include additional components not shown, fewer components than shown, or different combinations, configurations, or quantities of the components shown.

Clients 190 of the distributed database 100 may represent external devices, systems, or entities with respect to the database. In one embodiment, the client devices may be implemented using any suitable number and configuration of computing devices, any of which may be implemented by the example computing device 3000 illustrated in FIG. 17. Clients 190 may convey network-based service requests to the ingestion router fleet 110 via one or more networks, e.g., to supply a stream of data for processing using the stream processors 140 and storage in the storage tiers 150A-150N. The network(s) may encompass any suitable combination of networking hardware and protocols necessary to establish network-based communications between client devices 190 and the distributed database 100. For example, the network(s) may generally encompass the various telecommunications networks and service providers that collectively implement the Internet. In one embodiment, the network(s) may also include private networks such as local area networks (LANs) or wide area networks (WANs) as well as public or private wireless networks. For example, both a given client device and the distributed database 100 may be respectively provisioned within enterprises having their own internal networks. In one embodiment, the network(s) may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the distributed database 100. In one embodiment, client devices may communicate with the distributed database 100 using a private network rather than the public Internet. In various embodiments, the various components of the distributed database 100 may also communicate with other components of the distributed database using one or more network interconnects.

Figure 2:
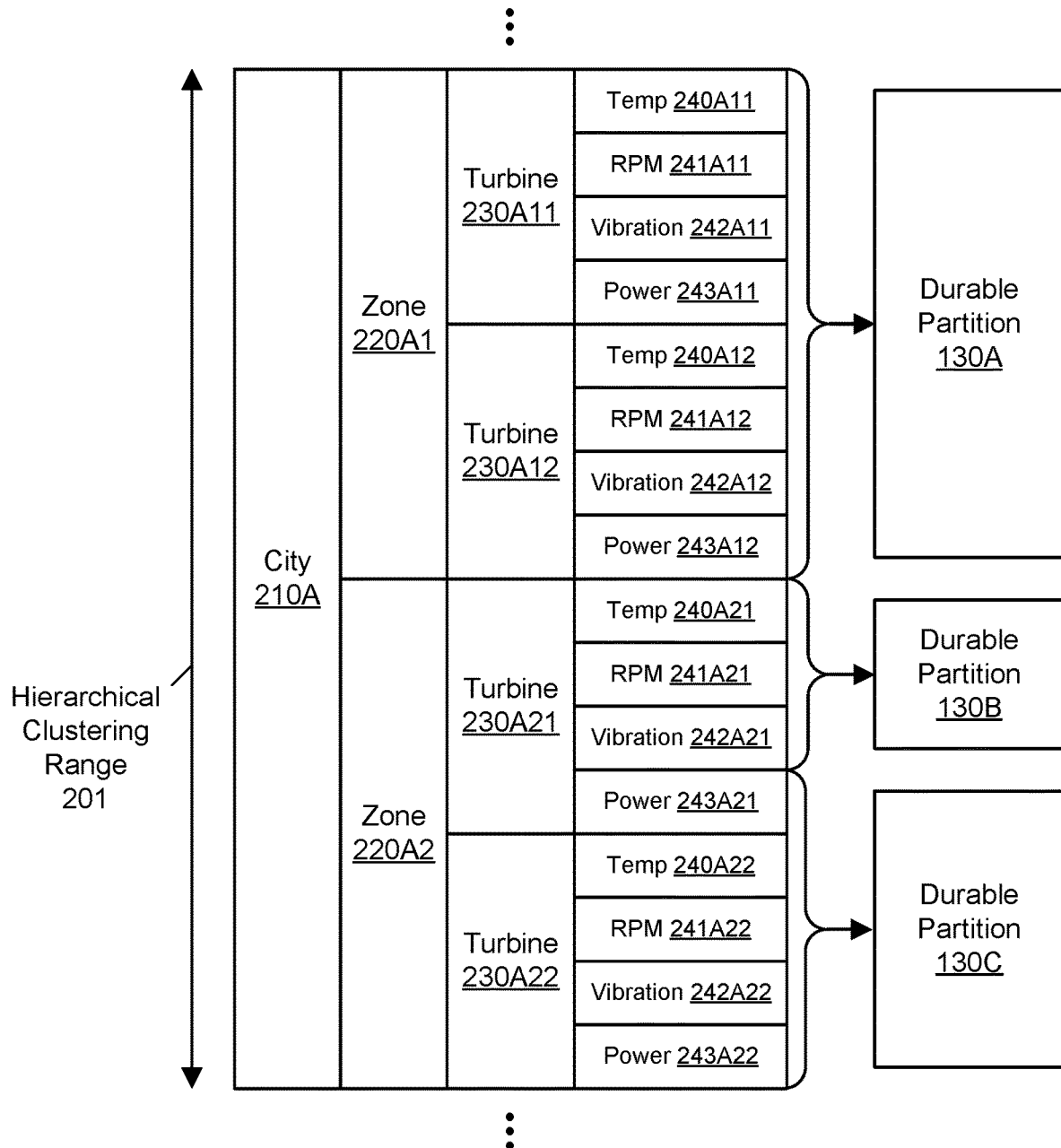
FIG. 2 illustrates further aspects of the example system environment for a scalable architecture for a distributed time-series database, including hierarchical clustering of ingested time-series data, according to one embodiment.

FIG. 2 illustrates further aspects of the example system environment for a scalable architecture for a distributed time-series database, including hierarchical clustering of ingested time-series data, according to one embodiment. The ingestion routers 110 may organize time-series data along a hierarchical clustering range 201. Some time series may be related to other time series via a hierarchy. Using hierarchical clustering, related time series may be placed near each other throughout their lifecycle in the time-series database 100. The use of hierarchical clustering may achieve a higher degree of compression for time-series data as well as lower latency for queries. The hierarchy may be specified by clients 190 or may be inferred automatically using contextual information, such as the geographical proximity of different time series, the generation of different time series by the same client device, and so on. The ingestion routers 110 may tag incoming data points so that hierarchically related series are co-located properly. A hash-based clustering scheme may be used at various stages of the database 100 to enforce the hierarchical clustering.

As shown in the example of FIG. 2, an example of a hierarchical relationship path for client devices representing wind-turbine sensors may be Country, State, City, Zone, Wind Turbine, and Metric. A portion of data having this hierarchical scheme may include data for a particular city 210A, two zones 220A and 220A32, and two turbines per zone 230A11, 230A12, 230A21, and 230A22. Turbine 230A11 may include measurements for temperature 240A11, RPM 241A11, vibration 242A11, and power 243A11. Turbine 230A12 may include measurements for temperature 240A12, RPM 241A12, vibration 242A12, and power 243A12. Turbine 230A21 may include measurements for temperature 240A21, RPM 241A21, vibration 242A21, and power 243A21. Turbine 230A22 may include measurements for temperature 240A22, RPM 241A22, vibration 242A22, and power 243A22. A hash-based clustering scheme supporting this hierarchy may co-locate all measurements for a given wind turbine, all wind turbines for a given zone, and so on. In one embodiment, all metrics of all wind turbines in a zone/city/state may be clustered together. In one embodiment, the hierarchical clustering may be changed over time and in response to query workloads in order to reduce the latency of queries. For example, the example data of FIG. 2 may be reorganized (for future data points) with temp, RPM, vibration, and power as higher-level constructs than the turbine identifiers.

The data points for the hierarchy shown in FIG. 2 may be mapped to various durable partitions by the ingestion routers 110. As shown in the example, the time-series data may be mapped and routed to partitions 130A, 130B, and 130C. In one embodiment, different numbers of time series may be mapped to different partitions based (at least in part) on the ingestion rate of those time series. Partitions may be split or merged as appropriate to adapt to changing ingestion rates for various time series. Each durable partition may support streaming. A particular partition may be mapped to a particular stream processor, e.g., for writing data from the partition to a particular storage tier. In one embodiment, partitions 130A-130C may represent shards of a streaming service 120. In one embodiment, partitions 130A-130C may represent database tables or other durable storage resources.

Figure 3:
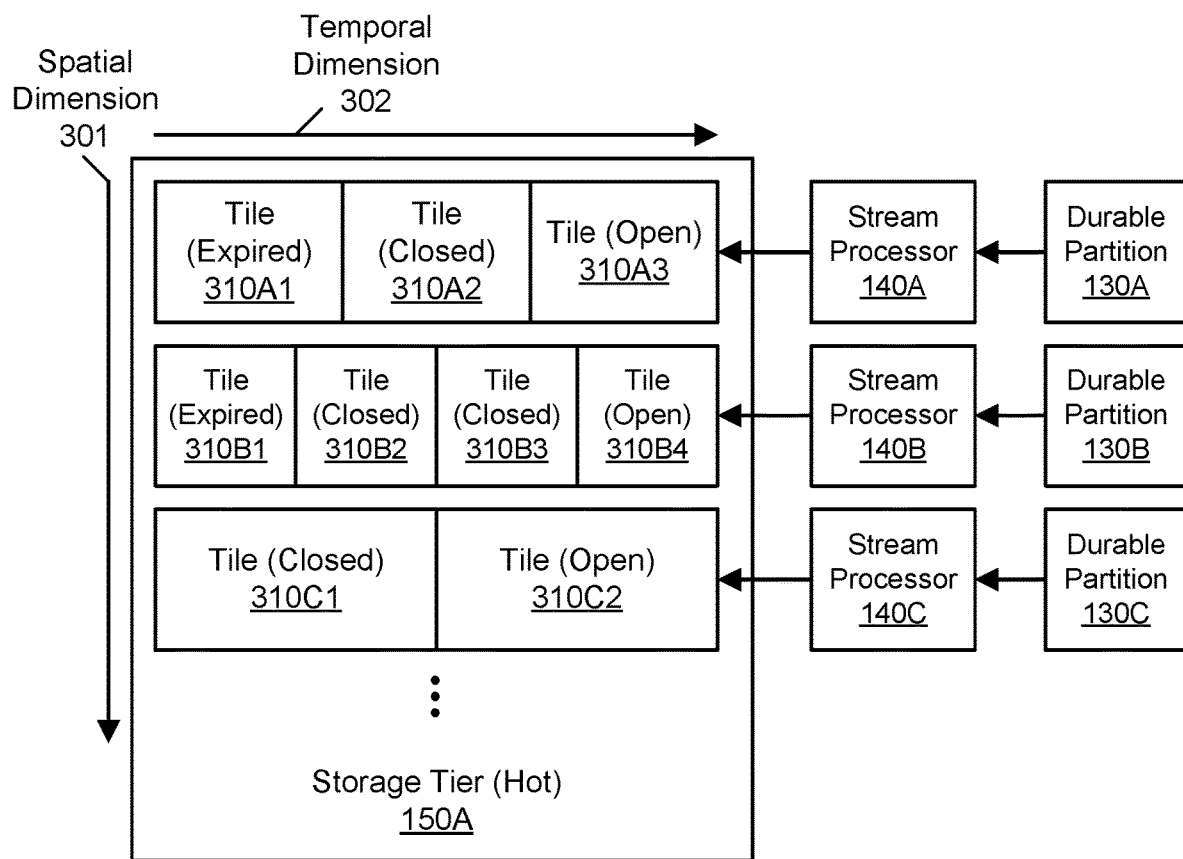
FIG. 3 illustrates further aspects of the example system environment for a scalable architecture for a distributed time-series database, including storage of time-series data using two-dimensional tiles in a hot tier, according to one embodiment.

FIG. 3 illustrates further aspects of the example system environment for a scalable architecture for a distributed time-series database, including storage of time-series data using two-dimensional tiles in a hot tier, according to one embodiment. As discussed above, the database 100 may include a hot storage tier such as tier 150A that stores recent data with high availability and low latency. In one embodiment, the hot tier 150A may include a set of storage hosts or storage nodes that include computational resources and memory resources. The storage nodes may store time-series data using tiles that are generated or appended to by stream processors. Tiles may be stored in memory (e.g., RAM) for lower latency of storage and retrieval. Tiles may be replicated across different nodes (e.g., in different data centers or availability zones) for improved durability. Tiles may be partitioned along non-overlapping spatial boundaries, e.g., such that time-series data from one time series is assigned to one tile while time-series data from another time series is assigned to another tile. However, a tile may hold one or more time series. The spatial range may be based on the hierarchical clustering range discussed above. Tiles may also be partitioned along non-overlapping temporal boundaries. Due to the spatial dimension 301 and the temporal dimension 302, tiles may be said to be two-dimensional. The two-dimensional partitioning represented in tiles may be decoupled from the partitioning of the ingestion stage due to the difference in write latency between the stages. The same partitioning scheme may be used, but the partition ranges may differ.

As discussed above, a set of time series may be mapped to durable partitions 130A, 130B, and 130C based on a hierarchical clustering scheme. Particular partitions may be mapped to particular stream processors for writing data from the partitions to the hot tier 150A. For example, partition 130A may be assigned to stream processor 140A that writes to the hot tier, partition 130B may be assigned to stream processor 140B that writes to the hot tier, and partition 130C may be assigned to stream processor 140C that writes to the hot tier. For a given time series or partition, tiles representing older windows of time may be termed "closed," while a tile representing a current window of time may be termed "open." Tiles may be closed when the amount of data reached a threshold or when a maximum time interval is reached. For current data points (e.g., data not received out of order), the stream processor for a partition may write to an open tile. Out-of-order data may be routed to previously closed tiles in some circumstances. Tiles whose temporal boundaries are beyond the retention period (e.g., three hours) for the tier and table may be deemed expired and either deleted or marked for deletion. As shown in the example of FIG. 3, stream processor 140A may write to an open tile 310A3 that was preceded in time by a now-closed tile 310A2 that was preceded in time by a now-expired tile 310A. Similarly, stream processor 140B may write to an open tile 310B4 that was preceded in time by a now-closed tile 310B3 that was preceded in time by a now-closed tile 310B2 that was preceded in time by a now-expired tile 310B1. Additionally, stream processor 140C may write to an open tile 310C2 that was preceded in time by a now-closed tile 310C1. As discussed above, the contents of a tile may be replicated (e.g., using three replicas) across different location or zones to achieve greater durability of the hot tier.

Figure 4:
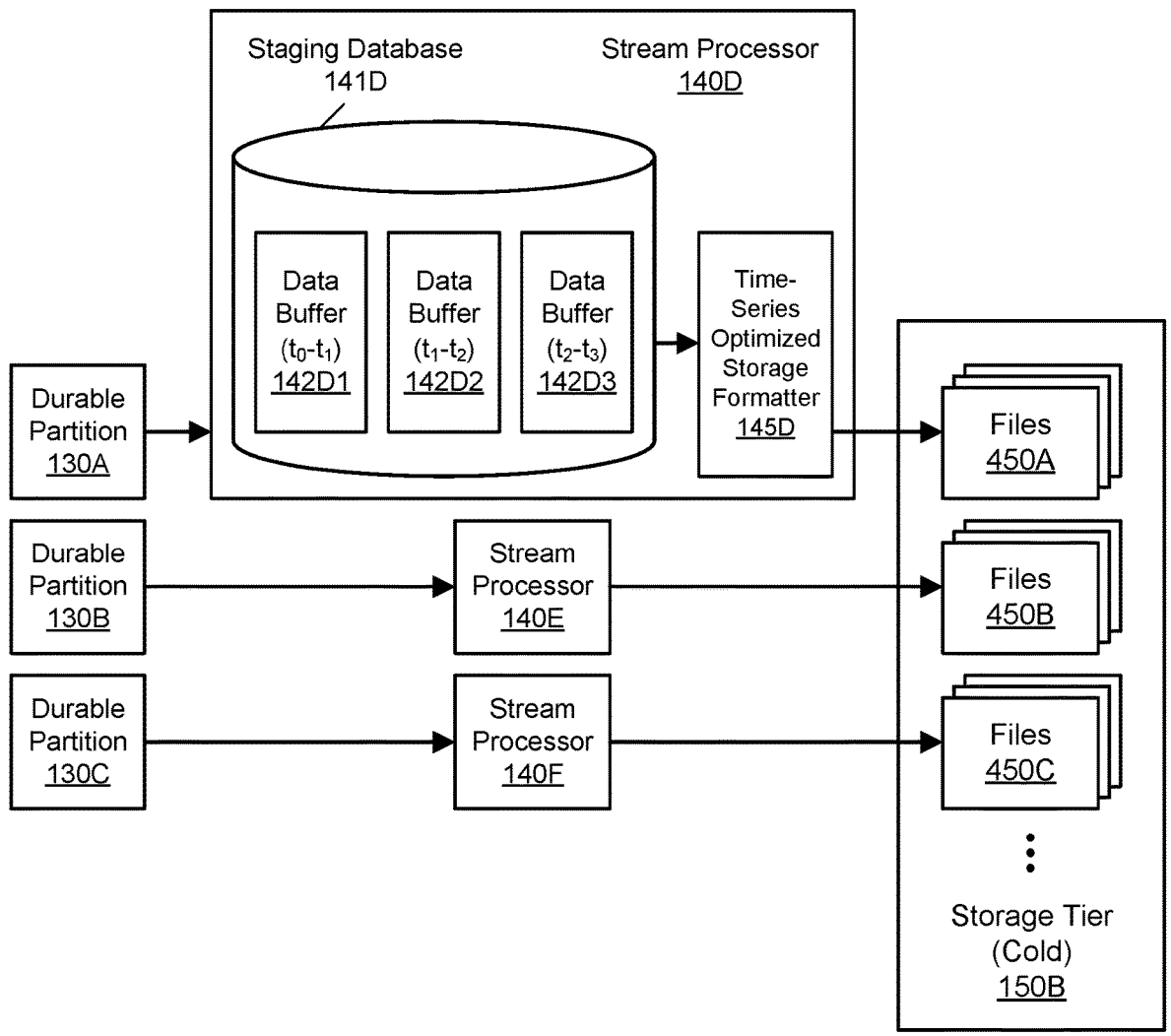
FIG. 4 illustrates further aspects of the example system environment for a scalable architecture for a distributed time-series database, including storage of time-series data using files in a cold tier, according to one embodiment.

FIG. 4 illustrates further aspects of the example system environment for a scalable architecture for a distributed time-series database, including storage of time-series data using files in a cold tier, according to one embodiment. A cold storage tier 150B may be used for storage of data over a longer period of time than the hot tier 150A. In one embodiment, the cold storage tier 150B may be implemented by a storage service that stores time-series data using files. The files may be stored using persistent storage resources (e.g., hard disk drives) that are managed by the storage service. The cold tier 150B may offer higher latency for storage and retrieval than the hot tier 150A but at a lower cost to clients. Particular partitions may be mapped to particular stream processors for writing data from the partitions to the cold tier 150B. For example, partition 130A may be assigned to stream processor 140D that writes files 450A to the cold tier, partition 130B may be assigned to stream processor 140E that writes files 450B to the cold tier, and partition 130C may be assigned to stream processor 140F that writes files 450C to the cold tier. The files may represent fixed-size columnar formatted files that are generated or appended to by stream processors. In one embodiment, the same data points from a particular partition may be written to multiple tiers (e.g., the hot tier 150A and cold tier 150B) concurrently, e.g., using different stream processors as shown in FIG. 3 and FIG. 4.

A stream processor that writes to the cold tier 150B may include a time-series optimized storage formatter, such as formatter 145D, that generates files that are optimized for storing time-series data. The stream records may first be placed into a staging database 141D bins or data buffers that store data for a given time duration. For example, buffer 142D3 may be used to store a current time interval, buffer 142D2 may be used to store an older time interval, and buffer 142D3 may be used to store an even older time interval. The staging database 141D may also be used to perform deduplication. When a data buffer's time has elapsed, it may remain in the staging database 141D up to a maximum threshold of time that has been chosen to allow for out-of-order data points. Once that threshold has been exceeded, the buffer may be optimized for storage and written to a file in the cold tier 150B. The formatter 145C may use optimizations such as columnar storage, time-series compression, and boundary statistics (e.g., bloom filters to indicate the presence of related attributes) to reduce the storage requirements for files.

Figure 5:
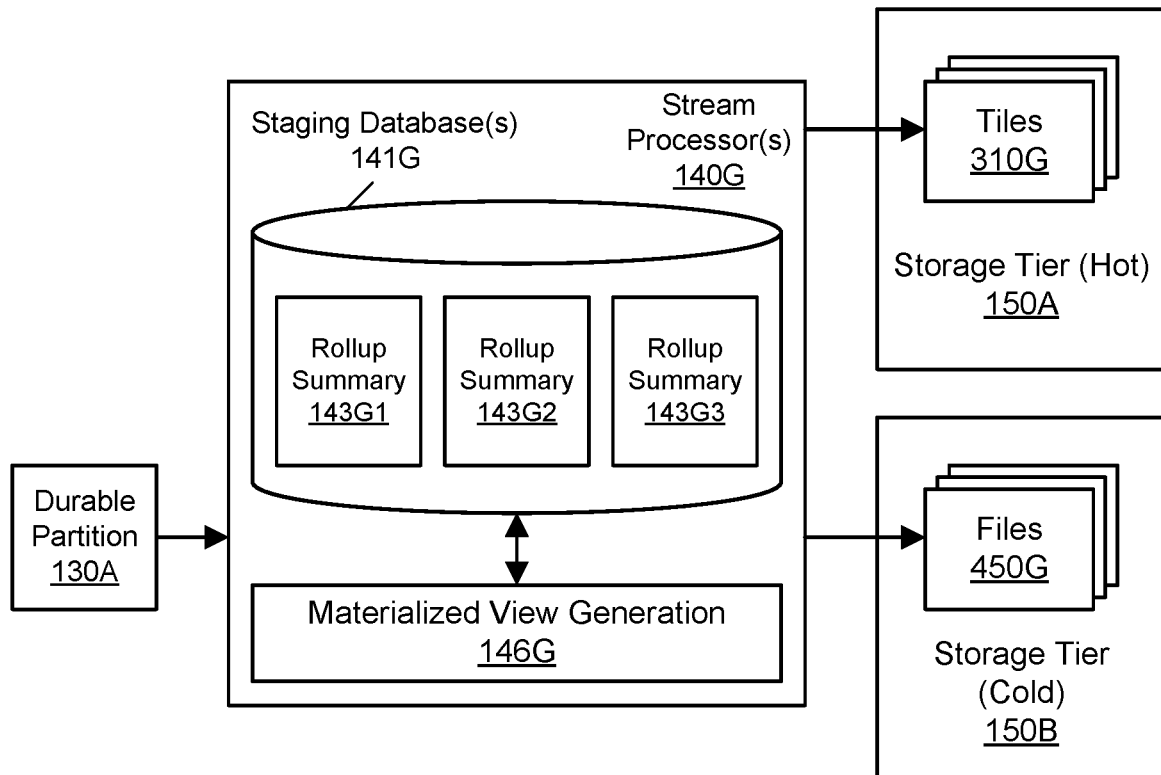
FIG. 5 illustrates further aspects of the example system environment for a scalable architecture for a distributed time-series database, including storage of aggregated time-series data in both a hot tier and a cold tier, according to one embodiment.

FIG. 5 illustrates further aspects of the example system environment for a scalable architecture for a distributed time-series database, including storage of aggregated time-series data in both a hot tier and a cold tier, according to one embodiment. As discussed above, stream processors may perform reordering, deduplication, aggregation of different time periods, and other transformations on time-series data. As shown in the example of FIG. 5, one or more stream processors 140G may include a component for materialized view generation 146G. The materialized view generation 146G may produce tables referred to as materialized views or derived tables. Derived tables may be generated using original tables. For example, a derived table may represent a rollup or aggregation of a particular time window for a partition 130A. Intermediate results may be generated over time and then combined to generate a derived table. For example, rollup summaries 143G1, 143G2, and 142G3 may be generated for successive smaller time intervals (e.g., one minute), maintained in one or more staging databases 141G, and combined for a larger time interval (e.g., one hour). The derived table may be written to different tiers by the one or more stream processors 140G. For example, the stream processor(s) 140G may write tiles 310G representing the derived table to the hot tier 150A and also write files 450G representing the derived table to the cold tier 150B.

The rollup summaries may be computed by the stream processor(s) 140G based (at least in part) on a scheduled query. A scheduled query may be defined by a user and may be run automatically by the database 100 at a fixed interval. Scheduled queries may allow developers to programmatically aggregate items from one table and write the output to a separate table for alerts, dashboarding, or long-term retention. Scheduled queries may be used to downsample and aggregate segments of a time series, perform data selections (e.g., top, percentile, min, max), or perform other transformations (e.g., a moving average).

Figure 6:
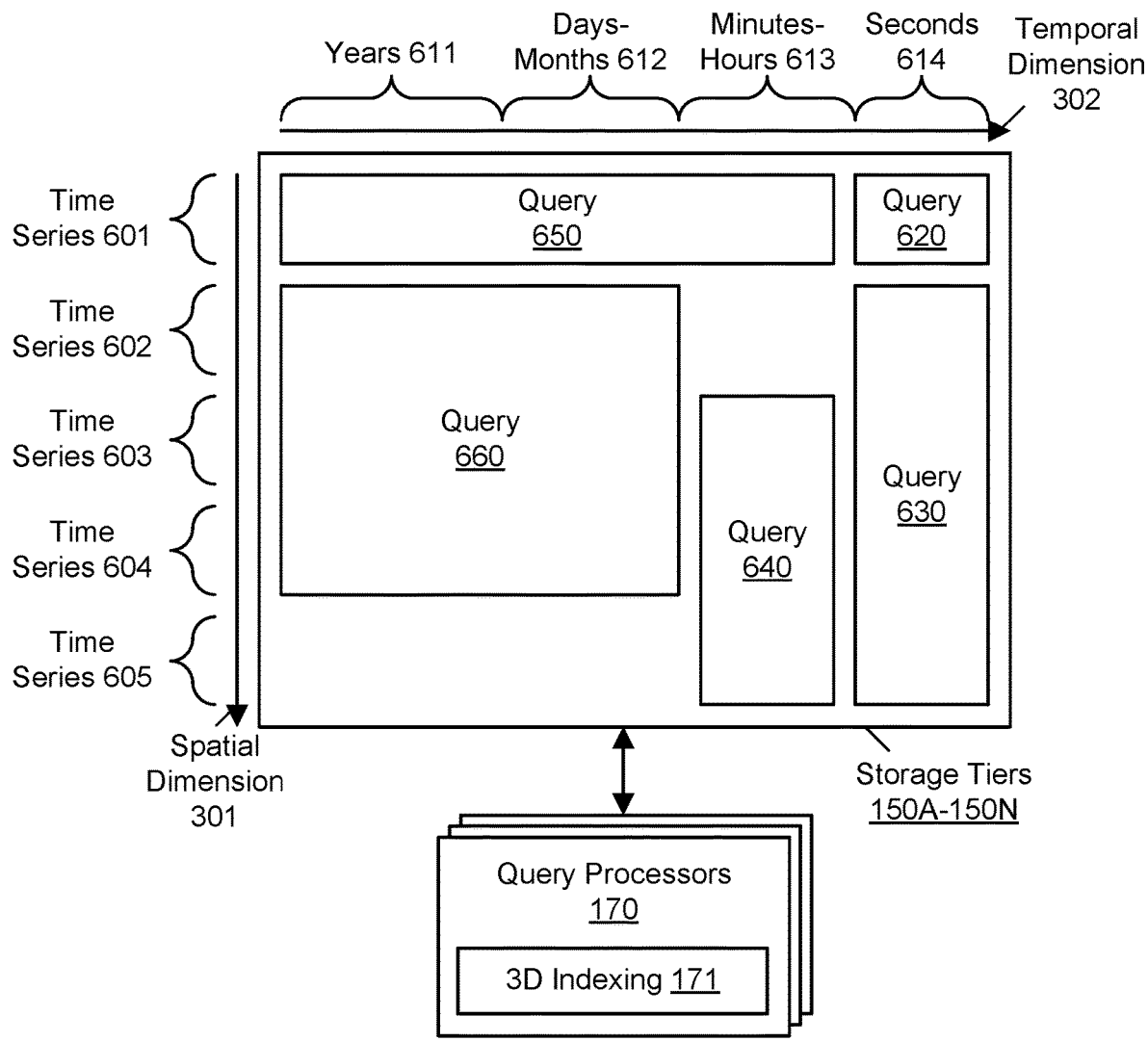
FIG. 6 illustrates further aspects of the example system environment for a scalable architecture for a distributed time-series database, including examples of queries of time-series data in one or more storage tiers, according to one embodiment.

FIG. 6 illustrates further aspects of the example system environment for a scalable architecture for a distributed time-series database, including examples of queries of time-series data in one or more storage tiers, according to one embodiment. As discussed above, time-series data may be partitioned or tiled along a spatial dimension 301 and also a time dimension 302. Because tiers may differ in their retention policies and latency for storing new data, some data points may be represented in one tier but not another. In one embodiment, the query processors 170 may rely on an index of time-series data that takes into account the spatial dimension and the time dimension along with a tier dimension. This 3D indexing 171 may permit the query processors 170 to direct query predicates to particular storage tiers and particular storage resources within those tiers.

As shown in the example of FIG. 6, a set of time-series data that is subjected to queries may belong to five different time series 601, 602, 603, 604, and 605. The time series 601-605 may represent original tables or derived tables. This time-series data may be maintained in one or more storage tiers for the most recent seconds 614 (or milliseconds, etc.), for prior time periods corresponding to minutes or hours 613, for prior time periods corresponding to days or months 612, and for prior time periods corresponding to years 611. For example, a hot tier may store data in the time ranges 614 and 613, while a cold tier may store data in the time ranges 613, 612, and 611. Queries 620-660 may represent different use cases. A query 620 may query over the most recent values of a particular time series 601, e.g., by interacting with the hot tier to obtain relevant query results. For example, the query 620 may represent a look into the most recent measurements of a specific sensor in near real-time. Another query 630 may query over the most recent values for several time series 602, 603, 604, and 605, also by interacting with the hot tier. For example, the query 630 may be associated with an alarm that is raised when a particular measurement threshold is exceeded over a fleet of client devices. A query 640 may query over time series 603, 604, and 605 over a longer period of time 613. For example, the query 640 may be used to populate a dashboard where all measurements in time proximity to an event are queried for anomalies in the last three hours. Yet another query 650 may be used for targeted historical analysis where months' worth of data for one time series 601 is queried for insight. Another query 660 may seek data for multiple time series across a long time range.

In one embodiment, queries may be coordinated using a scalable query routing layer that receives query requests from clients and directs those queries to individual query processors. In one embodiment, at least some of the query processors may be specific to particular storage tiers. In one embodiment, queries may use a syntax like that of Structured Query Language (SQL). Queries of the hot tier may be answerable by performing a scanning, filtering, and/or aggregation on data that is wholly contained within a tile. Queries of the hot tier may be composable by merging independent results from different tiles. Queries of the hot tier may have reasonably bounded results from tiles. Queries of the hot tier may not have an unbounded error for approximate aggregation algorithms.

The database 100 may be optimized for queries in a variety of data resolutions and formats. The query processors 170 may understand the location, resolution, and format of series data and thus simplify and expedite the synthesis of multiple time series. For example, time data in the hot tier can be stored in a different resolution, format, and location than time data in a cold tier, and such differences may be transparent to the user application. Using the database 100, the query performance may deliver orders of magnitude gains by continuously processing streams of data that are instantly queryable and up-to-date. For example, a developer can submit a query for evaluation at stream-processing time that the database 100 can continuously execute and return near real-time results. The database 100 may provide built-in functions for analytic capabilities (e.g., interpolation, extrapolation, approximation, and smoothing) to help developers find trends and patterns in time-series data.

Figure 7:
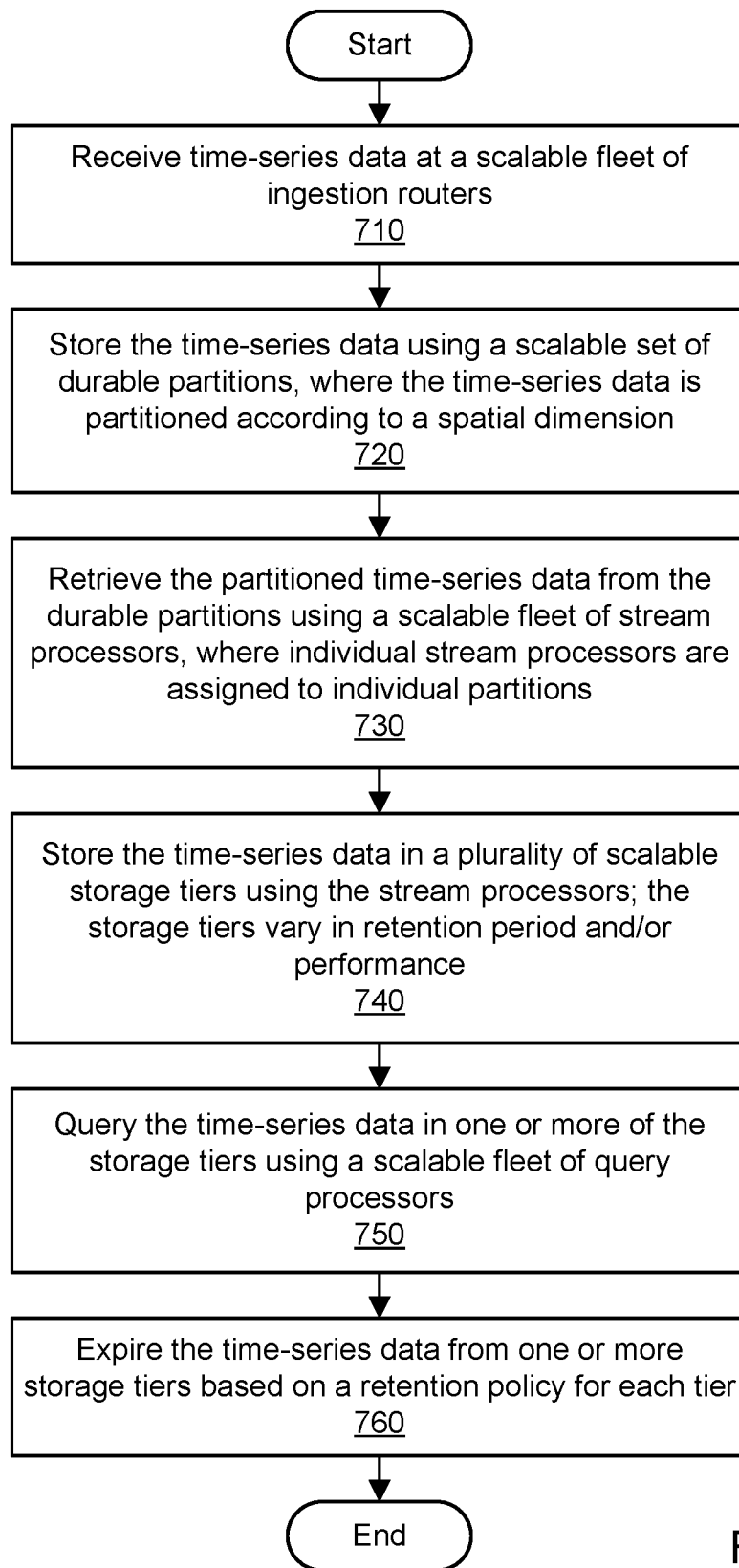
FIG. 7 is a flowchart illustrating a method for using a scalable architecture for a distributed time-series database, according to one embodiment.

FIG. 7 is a flowchart illustrating a method for using a scalable architecture for a distributed time-series database, according to one embodiment. The various operations shown in FIG. 7 may represent an example of a lifecycle for time-series data. As shown in 710, time-series data may be received at a scalable fleet of ingestion routers. As shown in 720, the time-series data may be stored using a scalable set of durable partitions. The time-series data may be partitioned according to a spatial dimension, e.g., using a hierarchical clustering scheme that seeks to co-locate related time series. The durable partitions may be provided by a streaming service or by a storage service. The size of the ingestion router fleet and the number of partitions may be scaled up or down according to the ingestion rate, e.g., by a control plane that monitors and/or anticipates usage as it changes over time.

As shown in 730, the partitioned time-series data may be retrieved from the durable partitions using a scalable fleet of stream processors (table builders). Individual stream processor may be assigned to handle particular partitions. Stream processors may perform aggregations (rollups) and other transformations of time-series data. The size of the stream processor fleet may be scaled up or down according to the rate or amount of time-series data being processed, e.g., by a control plane that monitors and/or anticipates usage as it changes over time. The stream processor fleet may be decoupled from the ingestion fleet and scaled independently.

As shown in 740, the stream processors may store the time-series data as tables in one or more scalable storage tiers. The storage tiers may vary in their retention periods and performance characteristics. For example, a hot tier may store data in memory with a low latency but for a shorter retention period, while a cold tier may store data using files on disk with a higher latency but a longer retention period. A given storage tier may be scaled up or down based (at least in part) on the amount of data for the retention period. The set of storage tiers to which a time series is written, and the corresponding retention periods, may be configurable by clients to meet their query needs and budgetary restrictions.

As shown in 750, the time-series data may be queried using a scalable fleet of query processors. The data may be queried in one or more of the storage tiers for a given query. The query processors may utilize a three-dimensional index that takes into account the spatial and temporal dimensions along with a knowledge of which tiers store which time periods. The stream processor fleet may be decoupled from the ingestion and stream processing fleets and scaled independently, e.g., based on the volume of queries. As shown in 760, the time-series data may expire from one or more storage tiers based (at least in part) on the retention policy for the data and the tier(s). For example, data may be deleted from a hot tier after three hours but may be deleted from the cold tier after one year.

Figure 8:
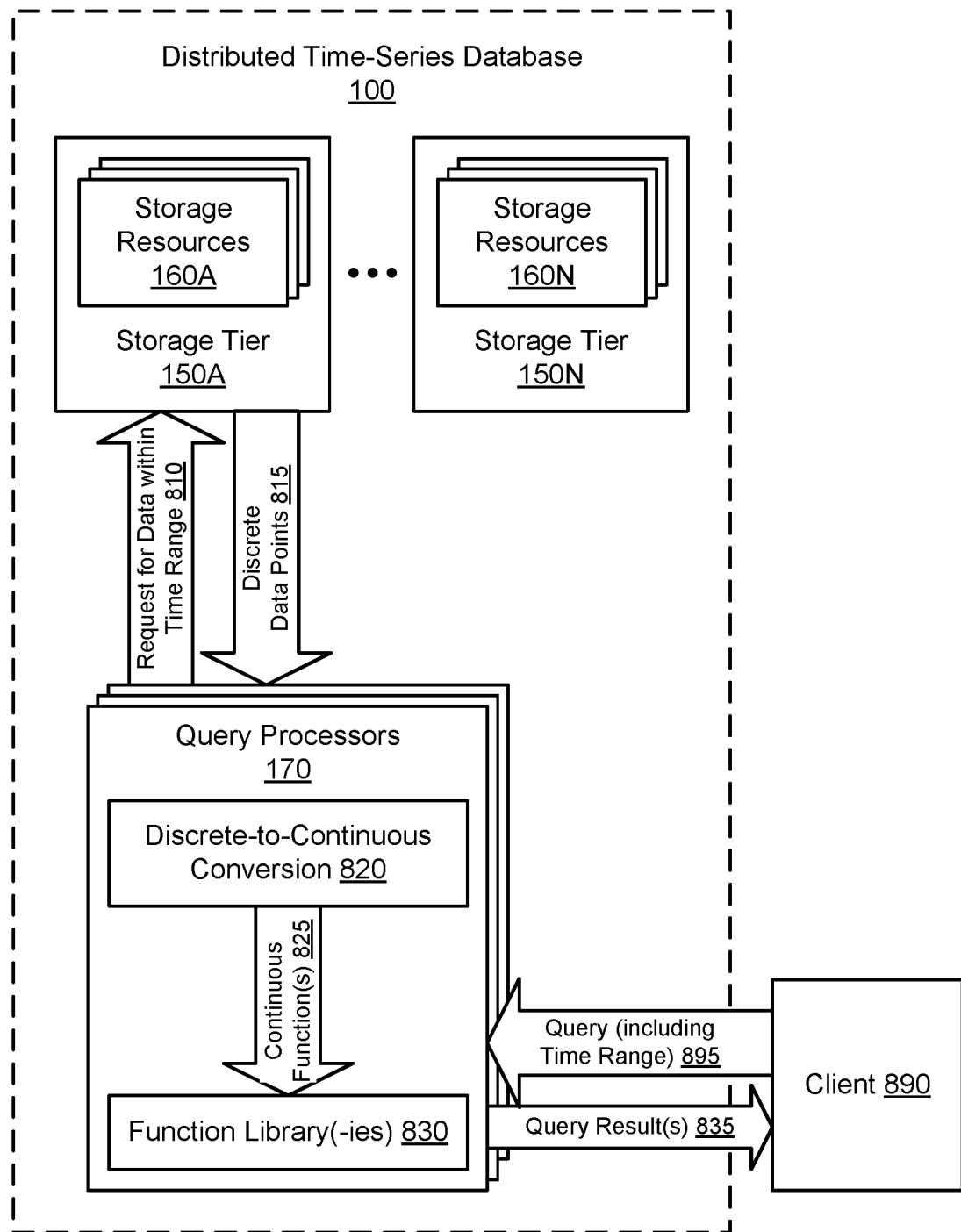
FIG. 8 illustrates an example system environment for implementing continuous functions in a time-series database, according to one embodiment.

FIG. 8 illustrates an example system environment for implementing continuous functions in a time-series database, according to one embodiment. In one embodiment, the time-series database 100 may support a query language for queries of the time-series data. The query language may include a syntax similar to that of Structured Query Language (SQL) and related languages. For example, the query language may include operators such as "SELECT," "FROM," and "WHERE." In contrast to other query languages, continuous functions representing time-series segments may represent first-class primitives in the query language offered by the database 100, such that the continuous functions may be referenced in queries using a datatype that represents time-series segments. As discussed above, a time series may include a sequence of data points representing different points in time. A data point may include a measurement and a timestamp, and any given contiguous subset of such data points may represent a segment of the time series. For example, a time-series segment in the database 100 for a time series representing a stock value at close may be represented as follows:

```
{
    dimensions: {
        'symbol': 'AMZN',
    },
    measure: 'close',
    measurements: [
        {timestamp: '2018-09-04', value: 2039.51),
        {timestamp: '2018-09-05', value: 1994.82),
        {timestamp: '2018-09-06', value: 1958.31),
        {timestamp: '2018-09-07', value: 1952.07)
    ]
}
```

A row in a table of the database 100 may include a sequence of discrete measurements at respective timestamps. For example, by allowing time-series segments to be first-class citizens of the query language, the segment shown above may be represented using the following row, with array datatypes for timestamps and measurement values:

| symbol | timestamp | close |
|--------|-----------|-------|
| AMZN | [9/4/2018, 9/5/2018, 9/6/2018, . . .] | [2039.51, 1994.82, 1958.31, . . .] |

As received and stored by the time-series database 100, a time series may thus represent a sequence of discrete data points that define different values for a measurement at a finite number of points in time. In one embodiment, the time-series database 100 may interpret a segment of such discrete measurements as a continuous one-dimensional function. Using the continuous function to represent a segment of the time series, the measurement may be defined at every potential point in time within a particular time range. The continuous function may then be used as input to other operations, such as mathematical functions, that expect a one-dimensional function as input. In one embodiment, the time-series database 100 may interpret a time-series segment as a continuous N-dimensional function, and the N-dimensional function may be used as input to other functions or operations. As shown in FIG. 8, the query processor fleet 170 may include a component for discrete-to-continuous conversion 820 to produce a continuous function based (at least in part) on discrete data points.

In various embodiments, the query language may permit one or more of the following functions to be specified in queries: min, max, distinct, first, last, derivative, moving average, percentile, cumulative sum, standard deviation, mean, median, count, sum, difference, top, and/or elapsed. In one embodiment, such functions may be used as projection clauses in queries. In one embodiment, such functions may be used as expressions in queries. In various embodiments, the query language may support one or more of the following set operators to be used in queries: union, interest, all, and/or except. In various embodiments, one or more of the following words may represent reserved words in the query language: dimension, record, table, database, series, measure, view, tier, retention, and/or describe. In one embodiment, the query language may represent a read-only approach. New data points may be added to the database 100 as discussed above with respect to FIG. 1. As also discussed above, the control plane 180 may provide additional interfaces for management of databases, tables, time series data, policies, and so on.

Queries may be generated by users of the time-series database 100 and provided to the query processors 170. As shown in the example of FIG. 8, a client 890 may provide a query 895 to one of the query processors 170. The client 890 may represent a client device and/or a query interface provided by the time-series database 100. In one embodiment, queries may be routed from users to the query processors 170 using one or more query routers. A query 895 may include several items that the query processors 170 may use to identify the underlying data for the query. A query 895 may indicate one or more time series, e.g., by specifying one or more dimensions. As discussed above, a time series may be uniquely identified by a set of dimensions. To be applicable to a particular time series, a query 895 may indicate all or part of the dimensions associated with that time series. A query 895 may also indicate a time range, e.g., an interval within a starting point in time and an ending point in time. In one embodiment, a current time range may include the current time as the ending time. In one embodiment, the time range for a query may be specified in the query language with a timerange( ) function in the WHERE clause, such as in the following example query:

```
SELECT linear_regression(close)
FROM table
WHERE
    timerange('9/4/2018','9/8/2018')
    AND symbol='AMZN'
```

In performing the query 895, a query processor may evaluate the time range indicated in the 895 to determine the time bounds. As discussed above, different storage tiers 150A-150N may store data points for the same time series, often at different ranges of time such as the most recent data in a hot tier and older data in a cold tier. The query processor may then determine which storage tier(s) and storage resources within the tier(s) to which query predicates should be sent, and the rest of the query may be executed against time-series segments that only contain data within the specified time range. For example, as shown in FIG. 8, a query processor may direct a request 810 for data within the specified time range to one or more storage resources (e.g., hot tier storage nodes) of the storage tier 150A. The storage tier 150A may respond with a set of discrete data points meeting appropriate terms (e.g., the FROM and WHERE clauses) of the query.

The query 895 may indicate a technique for interpreting the discrete measurements as a continuous function. For example, as shown above, the query 895 may indicate that the raw data points should be interpreted as a continuous function using linear regression. As another example, the query may indicate that the raw data points should be interpreted as a continuous function using linear interpolation. As another example, the query may indicate that the raw data points should be interpreted as a continuous function using spline interpolation. As yet another example, the query may indicate that the raw data points should be interpreted as a continuous function using flat interpolation. As an additional example, the query may indicate that the raw data points should be interpreted as a continuous function using cubic interpolation. As another example, the query may indicate that the raw data points should be interpreted as a continuous function using quadratic interpolation. Using the designated technique, the discrete-to-continuous conversion component 820 may produce one or more continuous functions 825 based (at least in part) on the discrete data points 815. In one embodiment, the continuous function may be generated using adaptive sampling techniques to select which and how many data points to convert, and the query 895 may indicate an error tolerance or other parameters to be used in the adaptive sampling.

In one embodiment, the query 895 may indicate an operation to be performed using the resulting continuous function as an input to the operation. The operation may expect a continuous function as input rather than a discrete set of data points. In one embodiment, the operation may represent a mathematical function. In one embodiment, the operation may represent a scientific computing operation. The mathematical functions and/or scientific computing operations may be provided by one or more libraries 830. In one embodiment, the functions and/or operations may be implemented outside of the query processors 170 using query results as input, e.g., on client devices. In one embodiment, the names of the functions and/or operations may be included in a namespace of the query language such that the functions and/or operations can be specified in queries and performed by the query processors 170 or other components of the database 100. The query processor may produce one or more query results 835 based on the continuous function(s) 825, e.g., by applying one or more operations from the function library(-ies) 830. By permitting such functions and/or operations to be specified in simple queries expressed according to the query language, the time-series database 100 may simplify and facilitate complex operations on time-series data.

In various embodiments, a variety of functions and/or operations may be performed by the time-series database 100 using continuous functions as input. For example, the time-series database 100 may calculate the derivative of a time-series segment using a continuous function. As another example, the time-series database 100 may calculate the integral of a time-series segment using a continuous function. In various embodiments, the query language may support native queries of time-series data that perform the following operations using continuous functions representing time-series segments: interpolation, extrapolation, imputation, derivatives, definite integrals, approximate histograms and quantiles, sliding window statistics over time, downsampling, upsampling, adaptive sampling, smoothing, noise reduction, regression, forecasting, correlation, affine transformation (scaling and shifting), and/or frequency-domain transformation (Fourier transform).

Figure 9:
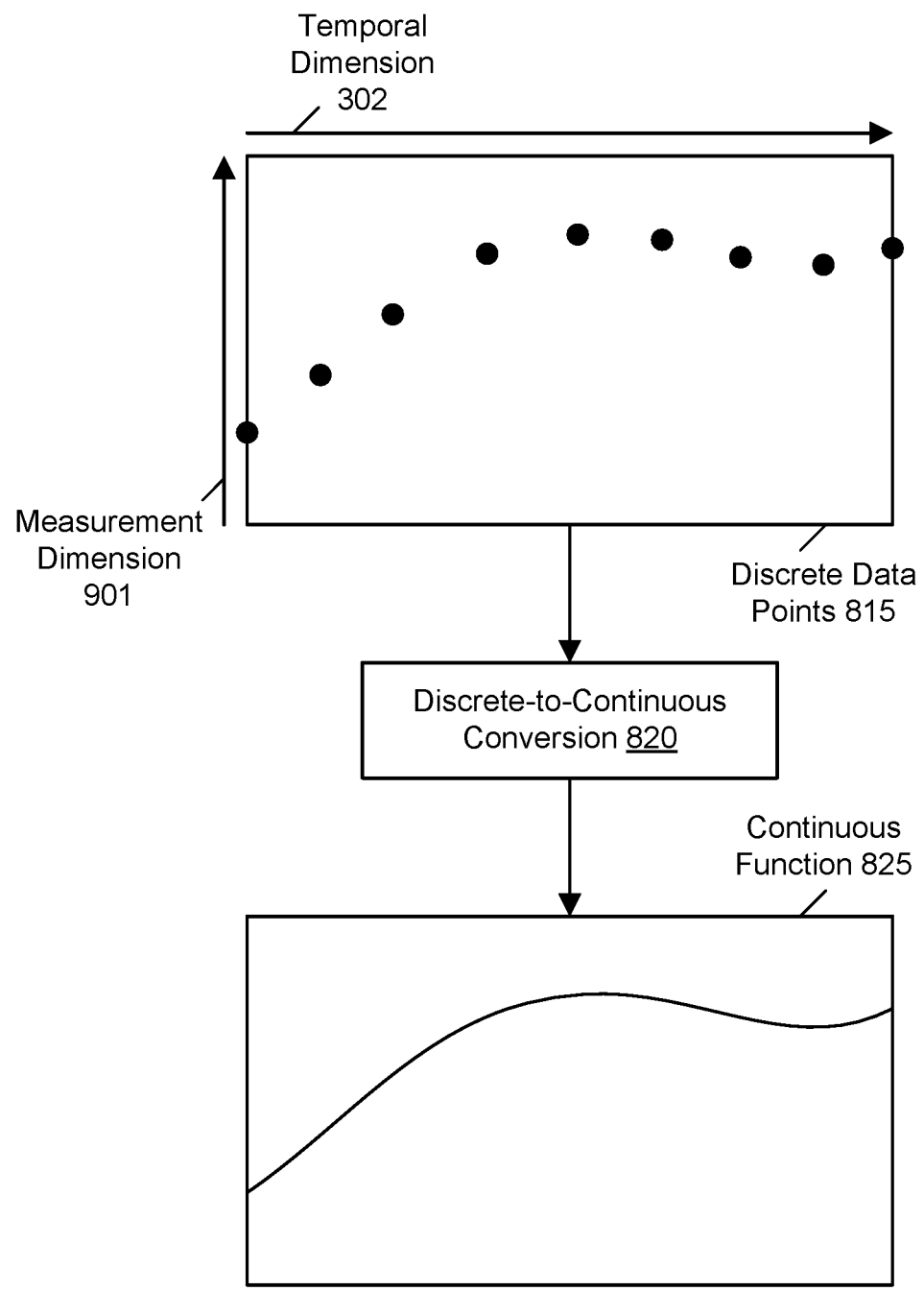
FIG. 9 illustrates further aspects of the example system environment for implementing continuous functions in a time-series database, including an example of discrete-to-continuous conversion, according to one embodiment.

FIG. 9 illustrates further aspects of the example system environment for implementing continuous functions in a time-series database, including an example of discrete-to-continuous conversion, according to one embodiment. A set of discrete data points 815 may represent a sequence of measurements along a measurement dimension 901 and a temporal dimension 302. The discrete data points 815 may represent a segment of a time series. Upon being retrieved from one or more storage tiers for query processing, the discrete data points 815 may be converted to a continuous function 825. The continuous function 825 may represent values for the measurement dimension 901 at all possible points in time 302 within the time range of the segment.

Figure 10A:
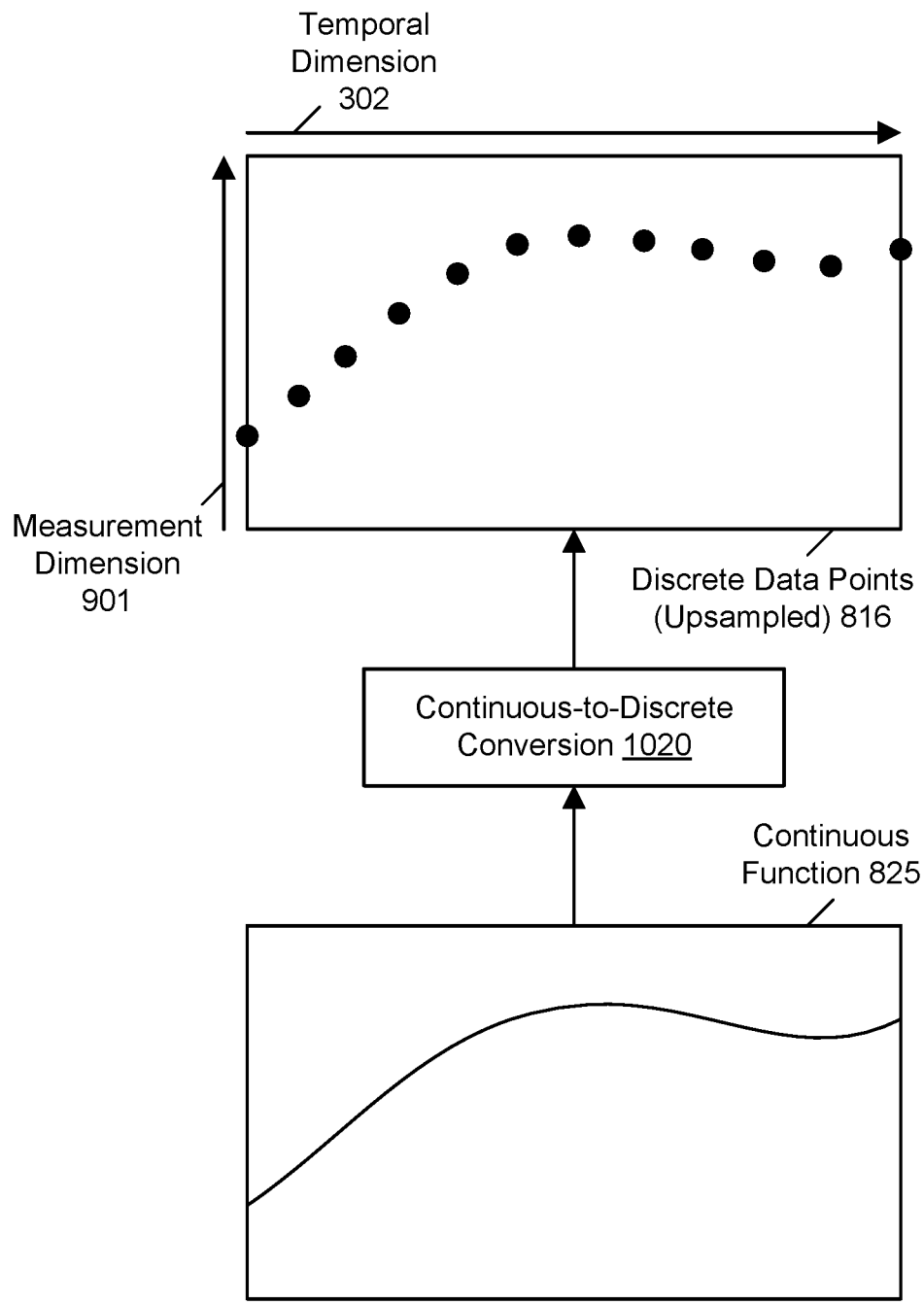
FIG. 10A and FIG. 10B illustrate further aspects of the example system environment for implementing continuous functions in a time-series database, including examples of continuous-to-discrete conversion, according to some embodiments.
Figure 10B:
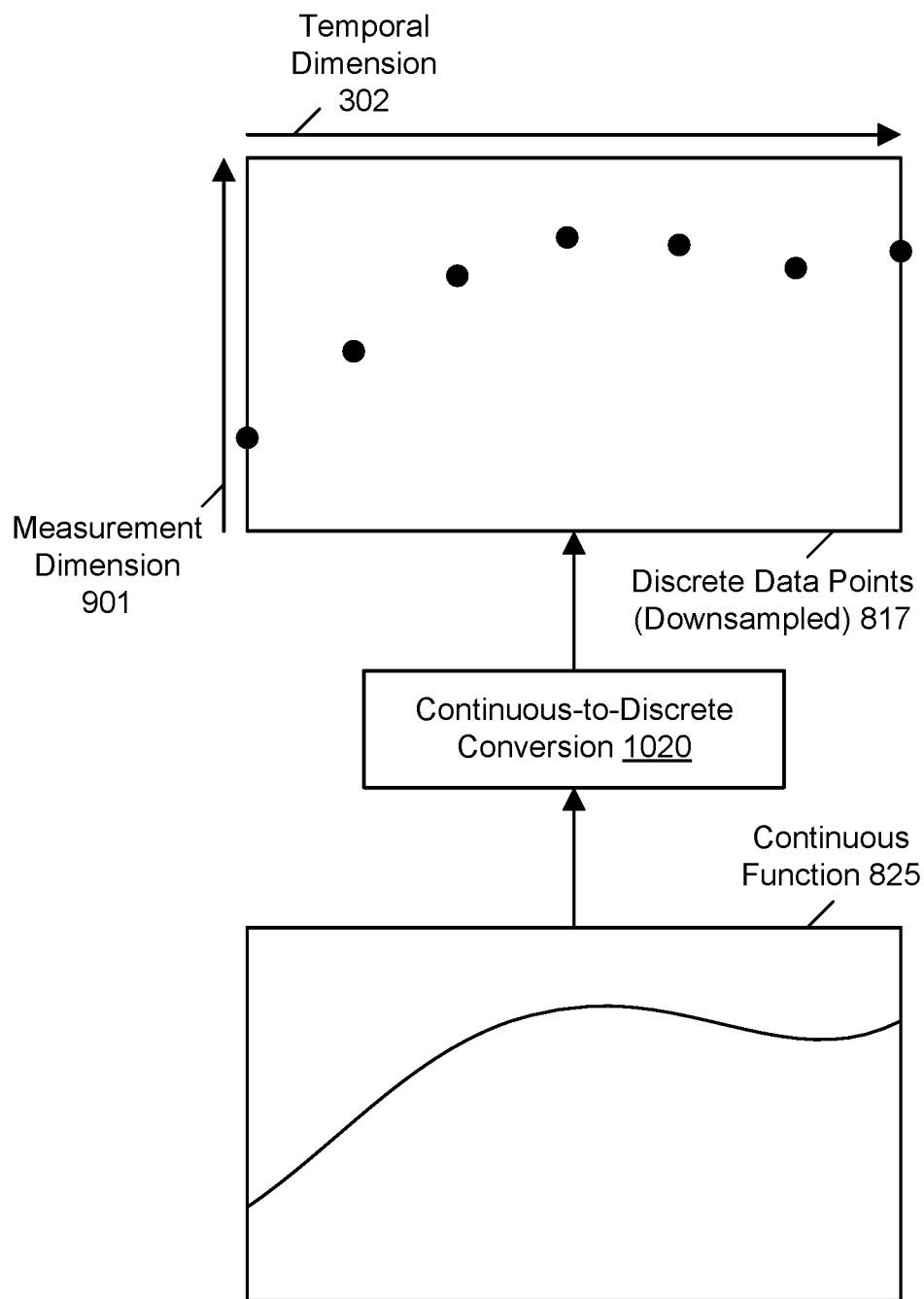

FIG. 10A and FIG. 10B illustrate further aspects of the example system environment for implementing continuous functions in a time-series database, including examples of continuous-to-discrete conversion, according to some embodiments. In one embodiment, a continuous function may be converted back to a discrete set of data points, e.g., using component for continuous-to-discrete conversion 1020 responsive to a query. In converting a discrete set of data points to a continuous function and then back to a discrete set of data points, the latter set may differ from the original set due to a difference in the sampling rate. For example, as shown in FIG. 10A, the sampling rate may be increased so that the latter (upsampled) set 816 includes a greater number of data points, including at least some data points at timestamps not represented in the original set. As another example, as shown in FIG. 10B, the sampling rate may be decreased so that the latter (downsampled) set 817 includes a smaller number of data points than the original set, potentially including at least some data points at timestamps not represented in the original set. The resulting discrete set of data points may be used as input to an operation that expects a discrete set and not a continuous function as input. For example, a cardinality operation that counts the number of unique values (e.g., measurements) may expect a discrete set of data points. The operation may again be specified in the query or may instead be performed by a function invoked by a user in a different way.

Figure 11:
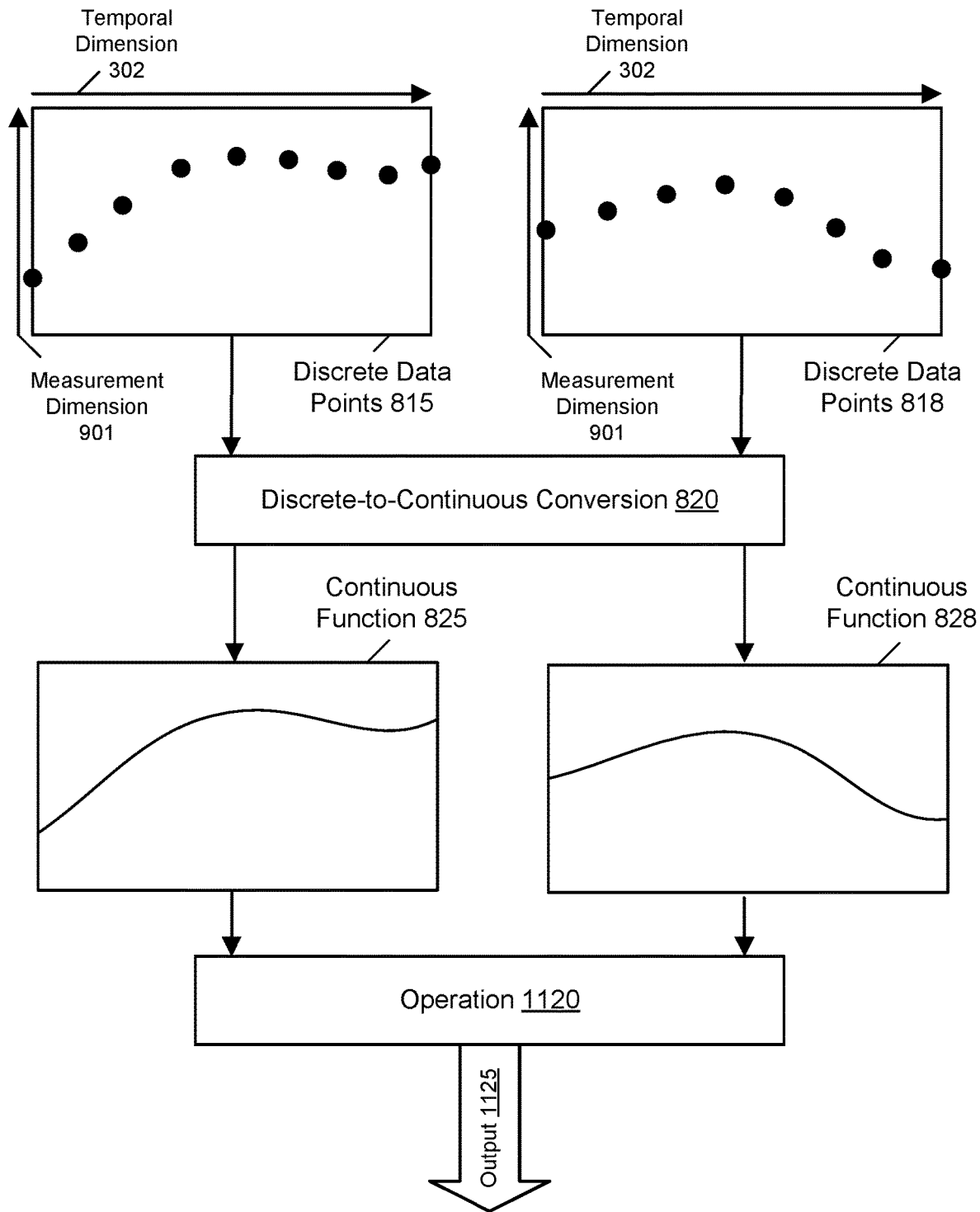
FIG. 11 illustrates further aspects of the example system environment for implementing continuous functions in a time-series database, including an example of discrete-to-continuous conversion of two time series segments for use with a single operation, according to one embodiment.

FIG. 11 illustrates further aspects of the example system environment for implementing continuous functions in a time-series database, including an example of discrete-to-continuous conversion of two time series segments for use with a single operation, according to one embodiment. In one embodiment, a plurality of time series segments (from one or more time series) may be converted to continuous functions, and the continuous functions may be used as inputs to a single operation. For example, two time-series segments interpreted as continuous functions may be combined into a resulting output segment that is also a continuous function. As shown in the example of FIG. 11, one time-series segment with discrete data points 815 may be converted to a continuous function 825, another time-series segment with discrete data points 818 may be converted to another continuous function 828, and both continuous functions 825 and 828 may be used as inputs to an operation 1120 that produces an output 1125. By converting two or more datasets to continuous functions, multiple time-series segments may be operated upon in a single operation 1120 even if the underlying data points exist at different frequencies in the raw datasets such that the timestamps are not aligned across the raw datasets. The representation of time-series data as continuous functions may simplify such operations by eliminating the need for a user to write multiple complex queries to perform conversions.

As an example of a query that uses multiple continuous functions, linear interpolation may be used to generate values between timestamps for two different time series as follows:

```
SELECT symbol,
    myTimestamps,
    sample(linear(close), myTimestamps)
FROM myTable,
    ['2011-01-01', '2012-01-01', '2014-01-01'] as myTimestamps
WHERE
    timerange('2010-01-01','2015-01-01')
    AND (symbol = 'AMZN'
        OR symbol = '.DJIA')
```

As another example of a query that uses multiple continuous functions, cubic spline interpolation may be used to downsample time series into arrays of timestamps at two-week intervals within the query's time range:

```
SELECT symbol AS label,
    biWeeklyTimestamps as t,
    sample(spline(close), biWeeklyTimestamps) as v
FROM myTable,
    'P2W' as biWeeklyTimestamps
WHERE
    timerange('2010-01-01','2015-01-01')
    AND (symbol = 'AMZN'
        OR symbol = '.DJIA')
```

As yet another example of a query that uses multiple continuous functions, locally weighted scatterplot smoothing (LOESS) may be used for weekly sampling:

```
SELECT symbol,
    P1W as t,
    sample(loess(close), 'P1W') as v
FROM myTable
WHERE
    timerange('2010-01-01','2015-01-01')
    AND (symbol = 'AMZN'
        OR symbol = '.DJIA')
```

As an additional example of a query, aggregation across time series may be performed as follows to produce a continuous function that can be sampled at any point within the time range and within a numerical tolerance of 10e-7:

```
SELECT timeseries_sum(linear(requests_per_second), 10e–7
FROM myTable
WHERE
    timerange('2018-01-01','2015-01-01')
GROUP BY datacenter
```

In one embodiment, the raw dataset representing discrete measurements may remain available to users. For example, raw data from a time-series segment may be fetched as in the following example query:

```
SELECT symbol,
    timestamps(close),
    values(close)
FROM table
WHERE
    timerange('2015-01-01','2015-01-31')
    AND symbol = 'AMZN'
```

Figure 12:
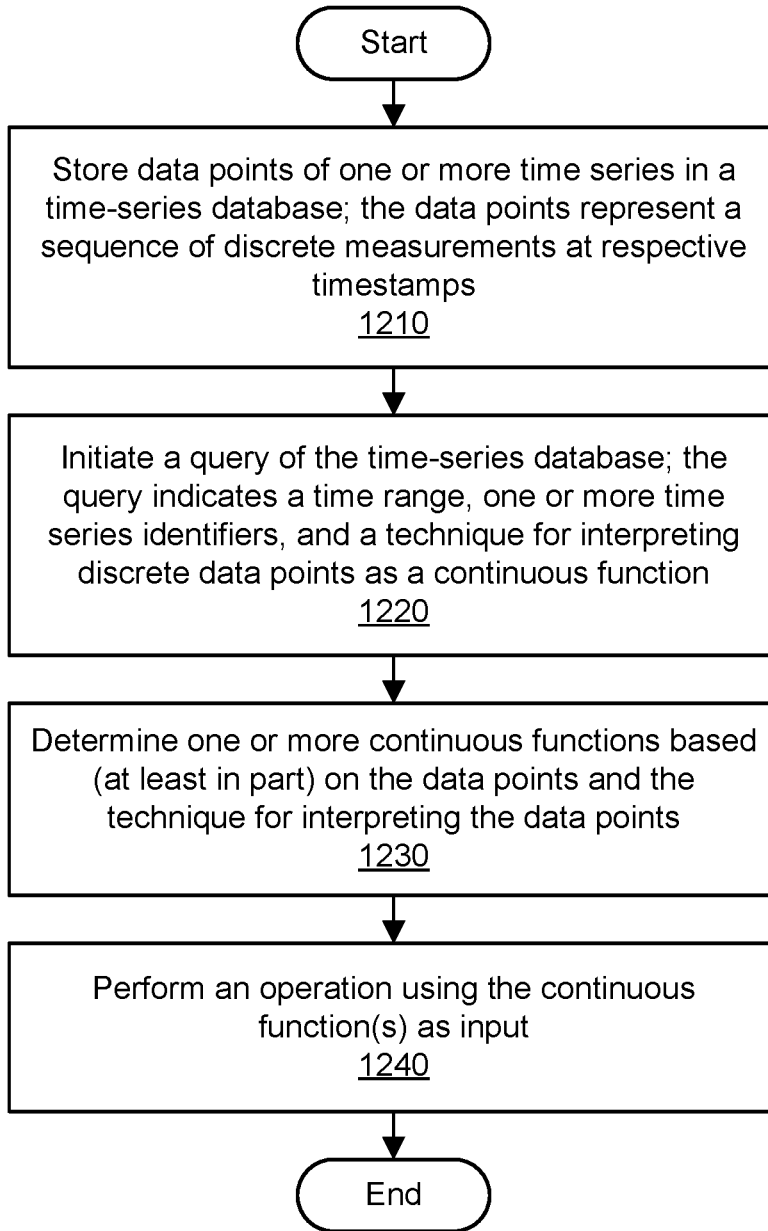
FIG. 12 is a flowchart illustrating a method for implementing continuous functions in a time-series database, according to one embodiment.

FIG. 12 is a flowchart illustrating a method for implementing continuous functions in a time-series database, according to one embodiment. As shown in 1210, data points of one or more time series may be stored in a time series database. The data points may be stored into one or more storage tiers as discussed above. The data points for a time series and a segment of time may represent a sequence of discrete measurements at respective timestamps.

As shown in 1220, a query of the time-series database may be initiated, e.g., by a query processor. At least a portion of the query may be provided by a user, e.g., using a query interface of the time-series database. The query may indicate a time range, one or more identifiers of one or more time series, and a technique for interpreting discrete data points as a continuous function. In one embodiment, the query may also indicate a mathematical function, scientific computing operation, or other operation to be performed using one or more continuous functions as input.

As shown in 1230, the time-series database may determine one or more continuous functions based (at least in part) on the data points and the technique for interpreting the data points. A resulting continuous function may represent values for a measurement across all potential points in time within the specified time range. As shown in 1240, an operation may be performed using the continuous function(s) as input. As noted above, the operation may also be identified in the query provided by the user. The query language in which the query is expressed may have a namespace that includes the names of numerous operations (e.g., mathematical and/or scientific computing operations) from one or more libraries of functions. The query language may permit queries to reference continuous functions of time-series segments as first-class primitives. By automatically converting discrete measurements to continuous functions, and by allowing queries to invoke complex operations that use those continuous functions as input, the time-series database may simplify and facilitate complex applications that use time-series data.

Figure 13:
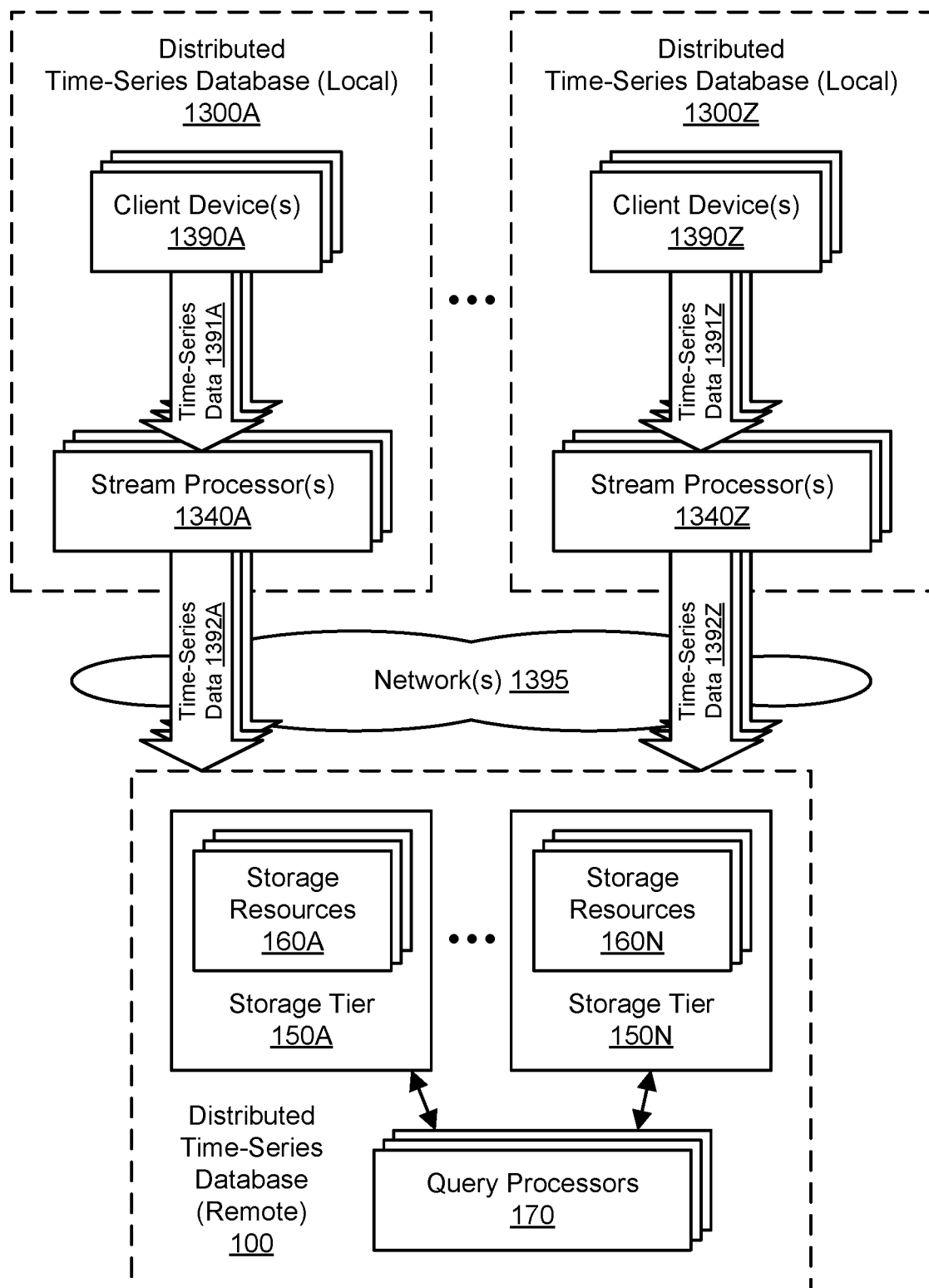
FIG. 13 illustrates an example system environment for edge processing in a distributed time-series database, according to one embodiment.

FIG. 13 illustrates an example system environment for edge processing in a distributed time-series database, according to one embodiment. The functionality of the time-series database 100 may be distributed using both local and remote components. The local components may be hosted at one or more client premises or other edge locations. The remote components may be hosted in a cloud-based environment 100. The cloud-based environment 100 may be accessible via one or more networks 1395. The network(s) 1395 may include a public network such as the Internet. As discussed above with respect to FIG. 1, the database may implement various stages using ingestion routers, durable partitions, stream processors, a plurality of storage tiers, and/or query processors. In various embodiments, aspects of one or more of the stages may be implemented both locally and remotely. For example, a local time-series database 1300A may take time-series data 1391A from one or more client devices 1390A, process the data using one or more stream processors 1340A, and send the original data 1391A or the derived data 1392A to the remote database 100 for storage and/or additional processing. Similarly, a local time-series database 1300Z may take time-series data 1391Z from one or more client devices 1390Z, process the data using one or more stream processors 1340Z, and send the original data 1391Z or the derived data 1392Z to the remote database 100 for storage and/or additional processing. In one embodiment, the client devices 1390A-1390Z may be hosted on client premises (e.g., sensors in a manufacturing facility or distribution warehouse).

In one embodiment, the client devices 1390A-1390Z may be hosted on different premises than the stream processors 1340A-1340Z.

Time-series data may be transformed locally using the stream processors 1340A-1340Z. For example, time-series data 1391A may be aggregated, summarized, and/or downsampled. The resulting time-series data 1392A may be smaller in size than the original dataset 1391A. By sending the derived data 1392A to the remote database 100 instead of the original data 1391A, less bandwidth of the network(s) 1395 may be used. Additionally, by using one or more of the storage tiers 150A-150N to store the derived data 1392A instead of the original data 1391A, use of the storage resources 160A-160N may be reduced. The derived time-series data 1392A may be sent to the cloud-based database 100 using compression and/or batching in order to further conserve use of the network(s) 1395. The local processing of time-series data by the stream processors 1340A-1340Z may include performing scheduled queries or other periodic analysis of the data. By performing queries and/or analysis locally rather than relying on the remote database 100, the local databases 1300A-1300Z may react more quickly to changes in time series. For example, if a measurement exceeds a threshold, then an alarm may be raised or other action taken locally without having to wait for the measurement to be sent to the remote database 100 and analyzed.

In some embodiments, as shown in FIG. 13, various local time-series databases may interact with the same remote time-series database 100 hosted in the cloud. For example, local time-series database 1300A through local time-series database 1300Z may be operated by or on behalf of different clients. As another example, local time-series database 1300A through local time-series database 1300Z may be operated by or on behalf of the same client. Local time-series databases 1300A-1300Z may represent single-tenant solutions hosted on client premises, while the remote time-series database 100 may represent a multi-tenant solution hosted in the cloud. As discussed above, the remote database 100 may include a plurality of storage tiers 150A-150N. In one embodiment, the storage tiers 150A-150N may store time-series data from multiple clients, e.g., as provided by various local databases 1300A-1300Z. Using the fleet of query processors 170, the remote database 100 may retrieve and analyze time-series data provided by different edge locations. For example, sensor data from instrumented automobiles may be collected at the remote database 100 and analyzed to detect patterns across the fleet of automobiles. As another example, sensor data from different manufacturing or distribution facilities may be collected at the remote database 100 and analyzed to detect patterns across the different premises.

In addition to the storage tiers 150A-150N and query processors 170, the remote time-series database 100 may include a fleet of ingestion routers 110, a set of durable partitions 130, and a fleet of stream processors 140 as discussed above with respect to FIG. 1. In various embodiments, components of the databases 1300A-1300Z may be implemented using any suitable number and configuration of computing devices, any of which may be implemented by the example computing device 3000 illustrated in FIG. 17. In some embodiments, the computing devices may be located in any suitable number of data centers or geographical locations. In various embodiments, at least some of the functionality of the database 1300A or 1300Z may be provided by the same computing device or by different computing devices. In various embodiments, if any of the components of the database 1300A or 1300Z are implemented using different computing devices, then the components and their respective computing devices may be communicatively coupled, e.g., via one or more networks 1395. Any of the components of the databases 1300A-1300Z may represent any combination of software and hardware usable to perform their respective functions. In some embodiments, operations implemented by the databases 1300A-1300Z may be performed automatically, e.g., without a need for user initiation or user intervention after an initial configuration stage, and/or programmatically, e.g., by execution of program instructions on at least one computing device. In some embodiments, the databases 1300A-1300Z may include additional components not shown, fewer components than shown, or different combinations, configurations, or quantities of the components shown.

In one embodiment, the client devices 1390A-1390Z may be implemented using any suitable number and configuration of computing devices, any of which may be implemented by the example computing device 3000 illustrated in FIG. 17. Databases 1300A-1300Z may convey network-based service requests to the remote database 100 via one or more networks 1395, e.g., to supply streams or batches of data for processing and storage using the stream processors 140 and storage in the storage tiers 150A-150N. The network(s) 1395 may encompass any suitable combination of networking hardware and protocols necessary to establish network-based communications between local databases 1300A-1300Z and the remote database 100. For example, the network(s) 1395 may generally encompass the various telecommunications networks and service providers that collectively implement the Internet. In one embodiment, the network(s) 1395 may also include private networks such as local area networks (LANs) or wide area networks (WANs) as well as public or private wireless networks. For example, both a given local database 1300A-1300Z and the remote database 100 may be respectively provisioned within enterprises having their own internal networks. In one embodiment, the network(s) 1395 may include the hardware (e.g., modems, routers, switches, load balancers, proxy servers, etc.) and software (e.g., protocol stacks, accounting software, firewall/security software, etc.) necessary to establish a networking link between the given local database and the Internet as well as between the Internet and the remote database 100. In one embodiment, local databases may communicate with the remote database 100 using a private network rather than the public Internet. In various embodiments, the various components of a local database may also communicate with other components of the local database using one or more network interconnects.

Figure 14:
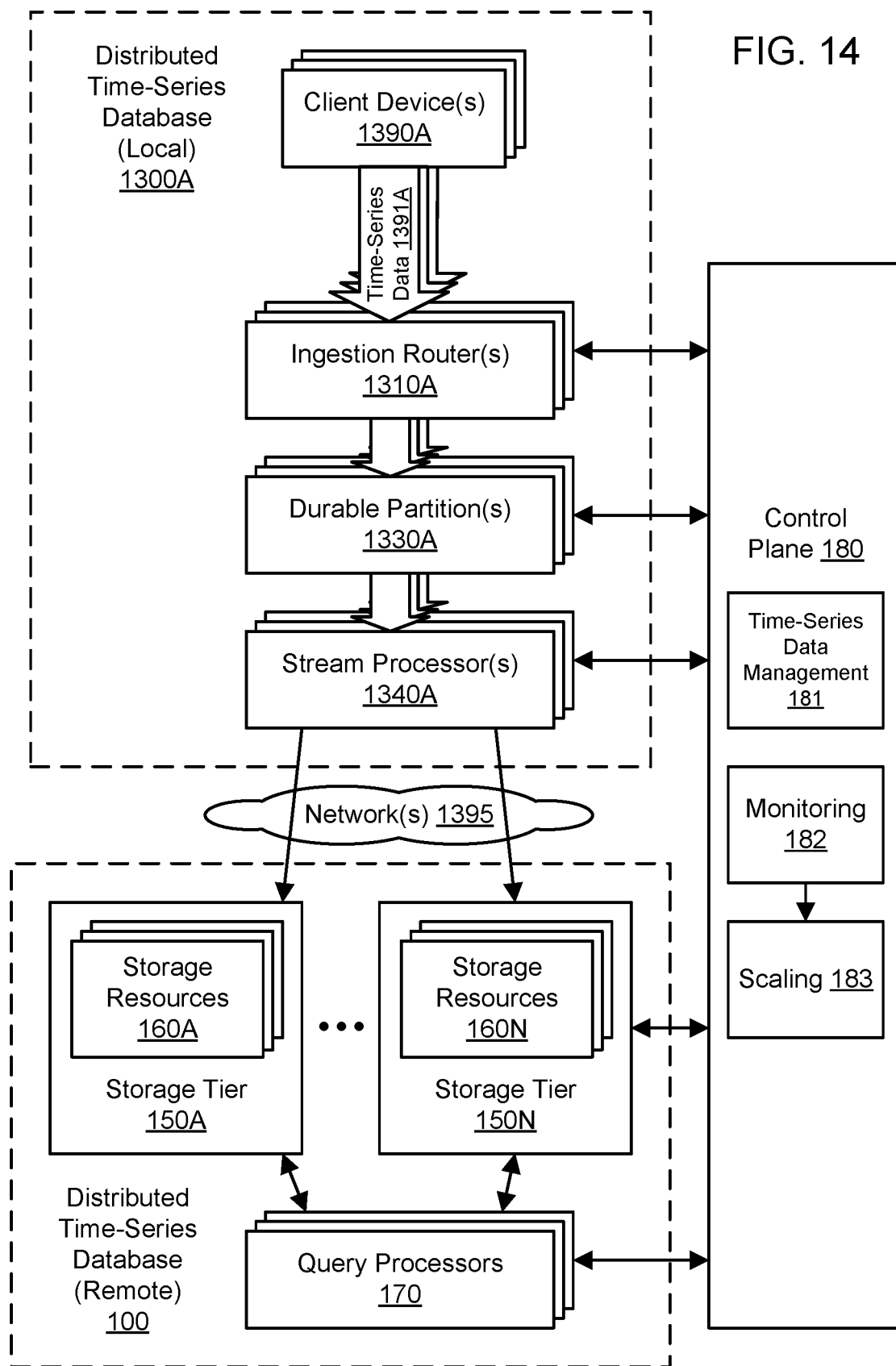
FIG. 14 illustrates further aspects of the example system environment for edge processing in a distributed time-series database, including a control plane for managing local and remote components of the time-series database, according to one embodiment.

FIG. 14 illustrates further aspects of the example system environment for edge processing in a distributed time-series database, including a control plane for managing local and remote components of the time-series database, according to one embodiment. A local time-series database 1300A may ingest and store time-series data 1391A. Elements of the time-series data 1391A may be received by the database 1300A from client device(s) 1390A over time, e.g., as one or more streams of time-series data. Client device(s) 1390A may represent various types of client devices that generate or otherwise provide data in various time series to the database 1300A. A time series may include a set of values that change over time, such as sensor measurements or system metrics, and that are timestamped or otherwise positioned along a temporal axis. For example, a set of client devices 1390A may repeatedly gather information such as vibration, temperature, and pressure using sensors. As another example, a set of client devices 1390A may detect state transitions, e.g., in a computer network. Client devices 1390A that provide the time-series data 1391A to the database 1300A may be associated with various domains such as Internet of Things (IoT) and "smart home" networks, autonomous vehicles, manufacturing facilities, distribution facilities, computational resources in a multi-tenant provider network, facilities management systems, stock trading systems, and so on. As discussed above, client devices 1390A may be internal or external to the same client premises or the same network as the other components of the local database 1300A.

The local database 1300A and remote database 100 may collectively manage time-series data 1391A throughout the lifecycle of the data. As shown in the example of FIG. 14, the local database 1300A may include one or more ingestion routers 1310A that implement similar functionality as the ingestion routers 110 discussed above. The ingestion router(s) 1310A may partition and store ingested time-series data 1391A into one or more durable partitions 1330A. The durable partition(s) 1330A may be implemented with similar functionality as the partitions 130 discussed above. The local database 1300A may include one or more stream processors 1340A that implement similar functionality as the stream processors 140 discussed above. For example, the stream processor(s) 1340A may store time-series data into one or more local storage tiers, send time-series data to the remote database 100, perform aggregations and other transformations on local time-series data, generate materialized views or derived tables using local time-series data, perform scheduled queries on local time-series data, and so on.

In one embodiment, the ingested data 1391A may be spatially partitioned along non-overlapping spatial boundaries according to the time series or range of the data, one or more tags associated with the data, the region that produced the data, the category to which the data belongs, and/or other suitable metadata. Ingested time-series data 1391A may be mapped to different partitions based on hierarchical clustering in order to achieve better performance of data storage and retrieval. A partition may include one time series or multiple time series. The partition(s) 1330A may be maintained using persistent storage resources and may be termed durable partitions. In one embodiment, the durable partition(s) 1330A may be provided by a local instance of a streaming service 120. The streaming service 120 may use shards or other divisions to implement the non-overlapping partition(s) 1330A. The data 1391A may be routed from the durable partition(s) 1330A to the stream processor(s) 1340A according to routing metadata, e.g., that maps different time series or ranges of the data to different stream processors. In one embodiment, a given stream processor 1340A may be assigned to one and only one partition at a time.

Some time series or hierarchies of time series may include very large numbers of measurements. In order to efficiently ingest, transform, store, and/or query such large quantities of data, the distributed database 100 may employ scaling techniques 183 as discussed above with respect to FIG. 1. By decoupling various stages of the distributed database 100 from each other, individual portions of the database may be scaled up or down by a control plane 180 to make better use of computational and storage resources while permitting near-real-time ingestion and querying of time-series data. A unified control plane 180 may be used for management of both local and remote components. In one embodiment, components of the local database 1300A may be scaled up or down using the monitoring 182 and scaling 183. For example, the control plane 180 may cause the local database 100 to increase the number of stream processors 1340A based on usage metrics (e.g., throughput) in the existing local stream processors. In one embodiment, the components of the local database 1300A may instead be fixed in quantity and not scaled using the control plane 180. The control plane 180 may be used to modify a configuration of the local database 1300A and/or remote database 100, e.g., using the component 181 for time-series data management to create or delete various databases, tables, or other aspects of time-series data.

Figure 15:
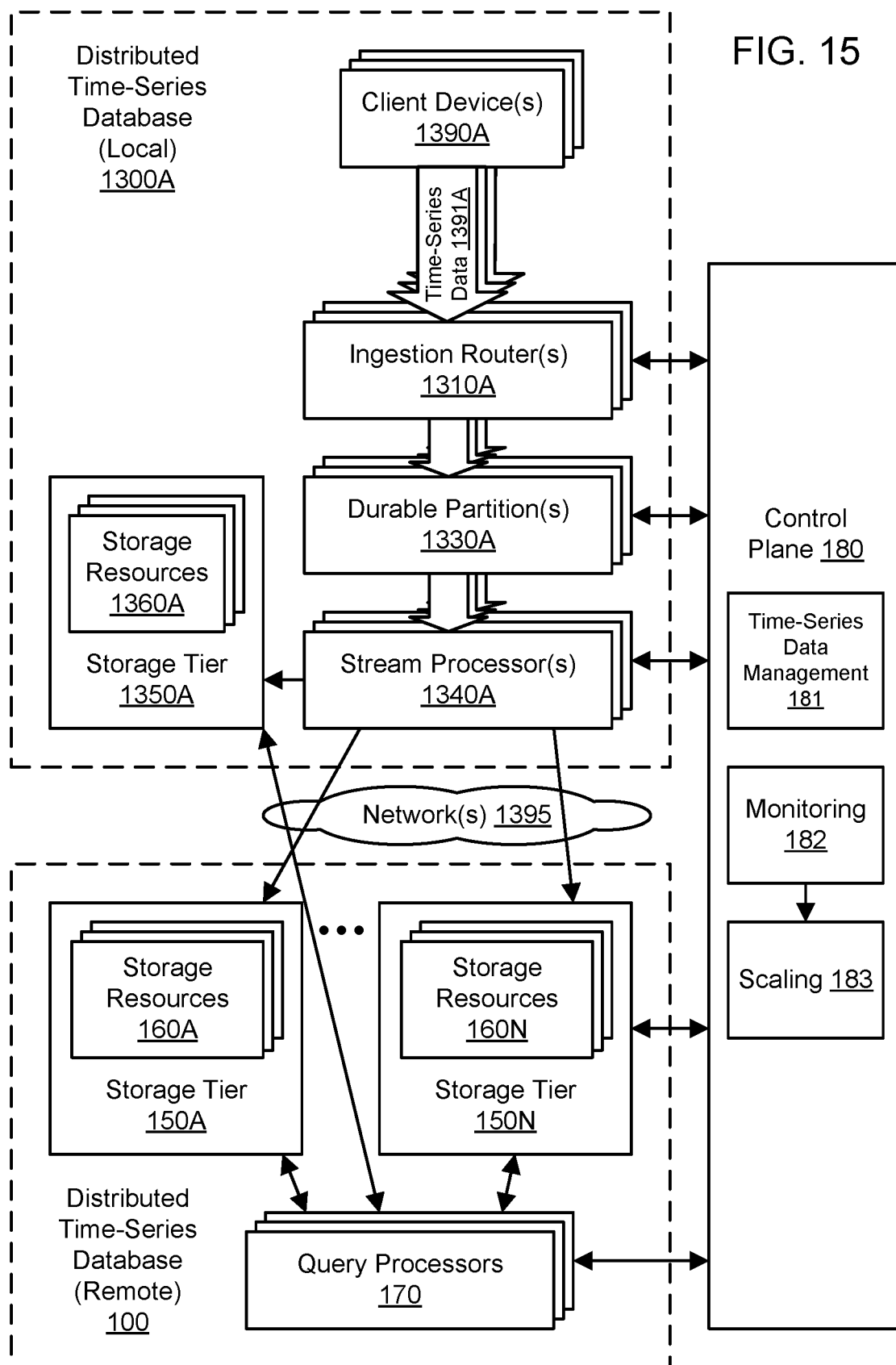
FIG. 15 illustrates further aspects of the example system environment for edge processing in a distributed time-series database, including a local storage tier of the time-series database, according to one embodiment.

FIG. 15 illustrates further aspects of the example system environment for edge processing in a distributed time-series database, including a local storage tier of the time-series database, according to one embodiment. Time-series data may be stored locally using local storage resources 1360A of the local time-series database 1300A. The storage resources 1360A may represent volatile memory resources (e.g., RAM), nonvolatile memory resources (e.g., flash storage), persistent storage resources (e.g., hard disk drives), and so on. In one embodiment, the control plane 180 may use scaling techniques 183 to increase or decrease the amount of the local storage resources 1360A, e.g., to meet the storage needs of the stream processor(s) 1340. The storage resources 1360A may be used by the stream processor(s) 1340A to store original tables as well as derived tables. In one embodiment, the stream processor(s) 1340A may perform scheduled queries and may store partial results using the storage resources 1360A. As a result of scheduled queries or other analysis performed by the stream processor(s) 1340A, actions may be taken at the local database 1300A without having to wait for analysis by the remote database 100. For example, if the local time-series database 1300A detects that a new measurement exceeds a threshold, then action may be taken locally in response to that measurement without having to send the time-series-data to the cloud and wait for analysis to be performed remotely. Using the techniques described herein, a distributed time-series database that includes both edge-based and cloud-based components may expedite the use of time-series data by reducing a reliance on the cloud-based portion of the system.

The storage resources 1360A may represent an additional, local storage tier 1350A of the distributed time-series database. In one embodiment, the local storage tier 1350A may have different performance characteristics (e.g., read and write latency) than one or more of the storage tiers 150A-150N. In one embodiment, the local storage tier 1350A may have a different retention policy than one or more of the storage tiers 150A-150N. The retention policy of the local storage tier 1350A may be modified using the unified control plane 180. Time-series data may be queried from the local storage tier 1350A and/or the remote storage tier(s) 150A-150N. A query may seek time-series data from one or more time series and one or more time ranges in order to perform analysis of the retrieved data. In one embodiment, the local database 1300A may include a local query processor that performs a query of the local storage tier 1350A. In one embodiment, the query processor fleet 170 of the remote database may be used to perform queries of both the local storage tier 1350A and one or more of the remote storage tier(s) 150A-150N. Queries of the local storage tier 1350A may be expressed according to the same query language as queries of the remote storage tiers 150A-150N. The local storage tier 1350A may include a query component that interacts with the remote query processors 170, e.g., to perform predicate pushdown to the local storage tier. The local storage tier 1350A may store the newest data points in a time series even before the lowest-latency tier (e.g., the hot tier 150A) of the remote database 100. By permitting queries of the local storage tier 1350A, the distributed time-series database may further reduce the latency of queries of recent time-series data.

Figure 16:
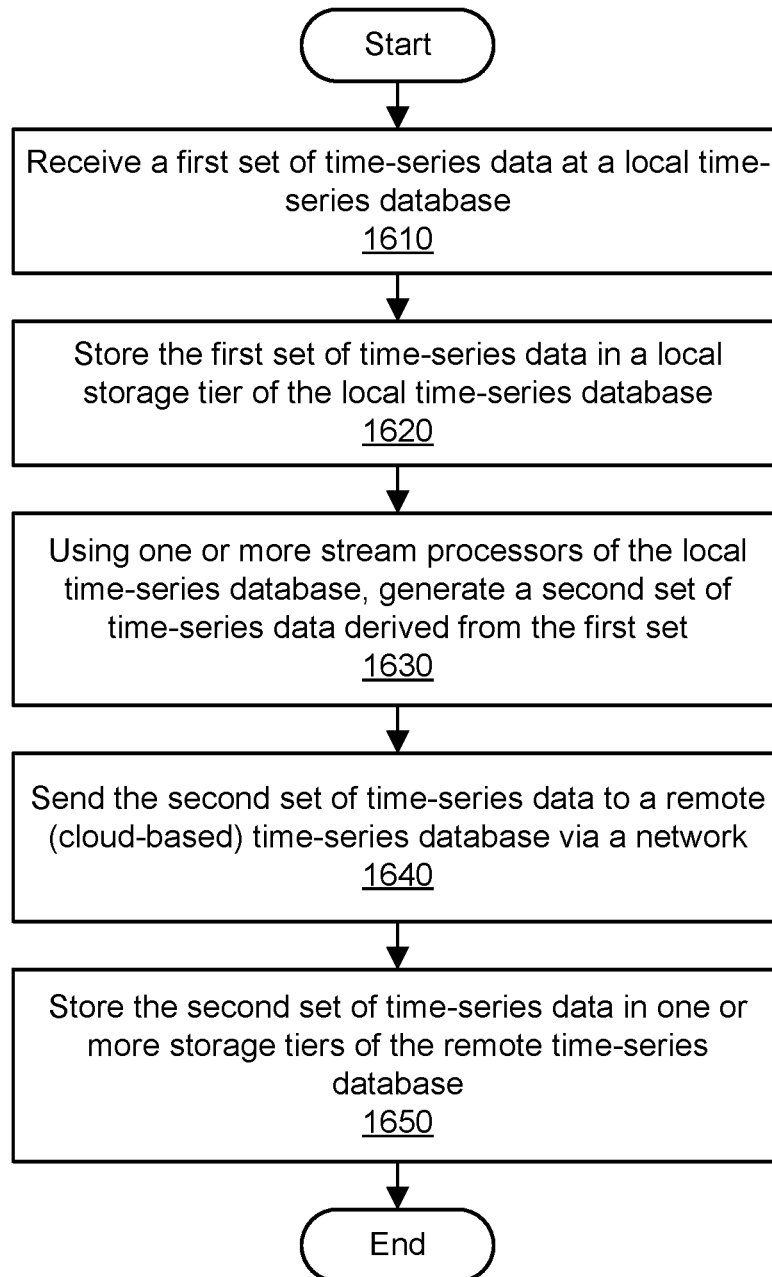
FIG. 16 is a flowchart illustrating a method for edge processing in a distributed time-series database, according to one embodiment.

FIG. 16 is a flowchart illustrating a method for edge processing in a distributed time-series database, according to one embodiment. As shown in 1610, a first set of time-series data may be received at a local time-series database. The first set of time-series data may be associated with one or more time series and may be generated by one or more client devices. At the local database, the first set of time-series data may be acquired using one or more ingestion routers that partition the data according to a spatial range and store the data using one or more durable partitions. As shown in 1620, the first set of time-series data may be stored in a local storage tier of the local time-series database, e.g., by one or more stream processors.

As shown in 1630, the stream processor(s) may generate a second set of time-series data that is derived from the first set of time-series data. For example, the second set may represent an aggregation, summary, rollup, downsampling, reordering, and/or deduplicated version of the data in the first set. The second set may be smaller in size than the first set. The stream processor(s) may store the second set locally, e.g., using the local storage tier. As shown in 1640, the second set of time-series data may be sent by the local database to a remote, cloud-based time-series database via a network. As shown in 1650, the second set of time-series data may be stored by the remote database using one or more storage tiers. For example, the data may be stored in a hot tier with a lower latency but a shorter retention policy and also in a cold tier with a higher latency but a longer retention policy. In one embodiment, data in the local storage tier may be queried locally. In one embodiment, data in the local storage tier may be queried by a query processor of the remote database, e.g., along with one or more of the remote storage tiers. In one embodiment, time-series data from multiple local databases representing different facilities or edge locations may be aggregated at the remote database and subjected to analysis. Using the techniques described herein, a distributed time-series database with both local and remote components may expedite the use of time-series data by reducing a reliance on a cloud-based portion of the system.

Illustrative Computer System

In at least some embodiments, a computer system that implements a portion or all of one or more of the technologies described herein may include a computer system that includes or is configured to access one or more computer-readable media. FIG. 17 illustrates such a computing device 3000 according to one embodiment. In the illustrated embodiment, computing device 3000 includes one or more processors 3010A-3010N coupled to a system memory 3020 via an input/output (I/O) interface 3030. In one embodiment, computing device 3000 further includes a network interface 3040 coupled to I/O interface 3030.

In various embodiments, computing device 3000 may be a uniprocessor system including one processor or a multi-processor system including several processors 3010A-3010N (e.g., two, four, eight, or another suitable number). In one embodiment, processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In one embodiment, in multiprocessor systems, each of processors 3010A-3010N may commonly, but not necessarily, implement the same ISA.

In one embodiment, system memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processors 3010A-3010N). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. In some embodiments, some or all of the functionality of I/O interface 3030, such as an interface to system memory 3020, may be incorporated directly into processors 3010A-3010N.

In one embodiment, network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, in some embodiments, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. In some embodiments, program instructions and/or data may be received, sent or stored upon different types of computer-readable media. In some embodiments, a computer-readable medium may include non-transitory storage media or memory media such as magnetic or optical media, e.g., disk or DVD/CD coupled to computing device 3000 via I/O interface 3030. In one embodiment, a non-transitory computer-readable storage medium may also include any volatile or nonvolatile media such as RAM (e.g. SDRAM, DDR SDRAM, RDRAM, SRAM, etc.), ROM, etc., that may be included in some embodiments of computing device 3000 as system memory 3020 or another type of memory. In one embodiment, a computer-readable medium may include transmission media or signals such as electrical, electromagnetic, or digital signals, conveyed via a communication medium such as a network and/or a wireless link, such as may be implemented via network interface 3040. The described functionality may be implemented using one or more non-transitory computer-readable storage media storing program instructions that are executed on or across one or more processors. Portions or all of multiple computing devices such as that illustrated in FIG. 17 may be used to implement the described functionality in various embodiments; for example, software components running on a variety of different devices and servers may collaborate to provide the functionality in one embodiment. In some embodiments, portions of the described functionality may be implemented using storage devices, network devices, or various types of computer systems. In various embodiments, the term "computing device," as used herein, refers to at least all these types of devices, and is not limited to these types of devices.

The various methods as illustrated in the Figures and described herein represent examples of embodiments of methods. In various embodiments, the methods may be implemented in software, hardware, or a combination thereof. In various embodiments, in various ones of the methods, the order of the steps may be changed, and various elements may be added, reordered, combined, omitted, modified, etc. In various embodiments, various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more processors and one or more memories storing computer-executable instructions that, when executed by the one or more processors, implement a distributed time-series database configured to:
store a plurality of discrete data points of a time series using one or more storage tiers, wherein the plurality of discrete data points comprises a plurality of discrete measurements at respective timestamps;
receive, from a client external to the time-series database, a request to analyze the time series, the request comprising a computing operation, wherein to analyze the time series the distributed time-series database is configured to perform the computing operation of the request using, as input, a continuous function of the time-series to represent the time series at every point in time over a time range of the time series specified in the request having a starting time and an ending time; and
responsive to receiving the request:
generate the continuous function of the time-series to perform the request, wherein to generate the continuous function of the time-series the distributed time-series database is configured to:
load a portion of the stored plurality of discrete data points in the indicated time range; and
apply a regression to the loaded portion of the stored plurality of discrete data points according to one or more conversion parameters specified in the request to generate the continuous function of the time series, wherein the continuous function is generated based at least in part on the discrete measurements at respective timestamps within the loaded portion of the stored plurality of discrete data points in the indicated time range;
perform the computing operation of the request using the continuous function of the time-series as input; and
return to the client a result based at least in part on an output of the performing of the computing operation.

2. The system as recited in claim 1, wherein the request indicates a technique for interpreting the data points, and wherein the continuous function is determined based at least in part on the technique.

3. The system as recited in claim 1, wherein the distributed time-series database is further configured to:
determine an additional continuous function representing a segment of an additional time series in the time range, wherein the request indicates the additional time series, wherein the additional continuous function is determined based at least in part on a plurality of data points of the additional time series, and wherein the plurality of data points of the additional time series represent a different frequency than the plurality of data points of the time series; and
wherein the operation is performed using the additional continuous function as an additional input.

4. The system as recited in claim 1, wherein the continuous function is determined using a subset of the data points, and wherein the subset is determined using adaptive sampling.

5. A method, comprising:
storing, into one or more storage tiers of a time-series database, a plurality of discrete data points of a time series, wherein the plurality of discrete data points comprises a plurality of discrete measurements at respective timestamps; and
executing, by one or more processors of the time-series database, a request, received from a client external to the time-series database, to analyze the time series, wherein the request comprises a computing operation to be evaluated using, as input, a continuous function of the time-series to represent the time series at every point in time over a time range specified in the request, and wherein the executing comprises:
generating the continuous function of the time-series database, comprising:
loading a portion of the stored plurality of discrete data points in the indicated time range; and
applying, by the one or more processors, a regression to the loaded portion of the stored plurality of discrete data points according to one or more conversion parameters specified in the request to generate the continuous function of the time series, wherein the continuous function is generated based at least in part on the discrete measurements at respective timestamps within the loaded portion of the stored plurality of discrete data points in the indicated time range; and
performing the computing operation of the request using the continuous function as an input; and
returning to the client a result based at least in part on an output of the performing of the computing operation.

6. The method as recited in claim 5, wherein the request indicates a technique for interpreting the data points, and wherein the continuous function is determined based at least in part on the technique.

7. The method as recited in claim 6, wherein the technique for interpreting the data points comprises linear interpolation.

8. The method as recited in claim 6, wherein the technique for interpreting the data points comprises spline interpolation.

9. The method as recited in claim 5, wherein the computing operation comprises a mathematical function applicable to the continuous function, and wherein the request indicates the mathematical function.

10. The method as recited in claim 5, wherein the time-series database comprises a table, and wherein the data points represent one row in the table.

11. The method as recited in claim 5, wherein the request indicates an additional time series, and wherein the method further comprises:
determining, by the one or more processors, an additional continuous function representing a segment of the additional time series in the time range, wherein the additional continuous function is determined based at least in part on a plurality of data points of the additional time series, and wherein the plurality of data points of the additional time series represent a different frequency than the plurality of data points of the time series; and wherein the operation is performed using the additional continuous function as an additional input.

12. The method as recited in claim 5, wherein the continuous function is determined using a subset of the data points, and wherein the subset is determined using adaptive sampling.

13. The method as recited in claim 5, further comprising:
determining, by the one or more processors, a discrete set of data points in the time range based at least in part on the continuous function.

14. One or more non-transitory computer-readable storage media storing program instructions that, when executed on or across one or more processors, perform:

storing, by one or more stream processors into one or more storage tiers of a time-series database, a plurality of discrete data points of a time series, wherein the plurality of discrete data points comprises a plurality of discrete measurements at respective timestamps; and executing, by one or more processors of the time-series database, a request, received from a client external to the time-series database, to analyze the time series, wherein the request comprises a computing operation to be evaluated using, as input, a continuous function of the time-series to represent the time series at every point in time over a time range specified in the request, and wherein the executing comprises:

generating the continuous function of the time-series database, comprising:

loading a portion of the stored plurality of discrete data points in the indicated time range; and applying, by the one or more processors, a regression to the loaded portion of the stored plurality of discrete data points according to one or more conversion parameters specified in the request to generate the continuous function of the time series, wherein the continuous function is generated based at least in part on the discrete measurements at respective timestamps within the loaded portion of the stored plurality of discrete data points in the indicated time range; and performing, by the one or more processors, the computing operation of the request using the continuous function as an input; and returning to the client a result based at least in part on an output of the performing of the computing operation.

15. The one or more non-transitory computer-readable storage media as recited in claim 14, wherein the request indicates a technique for interpreting the data points, and wherein the continuous function is determined based at least in part on the technique.

16. The one or more non-transitory computer-readable storage media as recited in claim 15, wherein the technique for interpreting the data points comprises linear interpolation or spline interpolation.

17. The one or more non-transitory computer-readable storage media as recited in claim 14, wherein the computing operation comprises a mathematical function applicable to the continuous function, and wherein the request indicates the mathematical function.

18. The one or more non-transitory computer-readable storage media as recited in claim 14, further comprising additional program instructions that, when executed on or across the one or more processors, perform:

determining, by the one or more processors, an additional continuous function representing a segment of an additional time series in the time range, wherein the request indicates the additional time series, wherein the additional continuous function is determined based at least in part on a plurality of data points of the additional time series, and wherein the plurality of data points of the additional time series represent a different frequency than the plurality of data points of the time series; and wherein the operation is performed using the additional continuous function as an additional input.

19. The one or more non-transitory computer-readable storage media as recited in claim 14, wherein the continuous function is determined using a subset of the data points, and wherein the subset is selected using adaptive sampling.

20. The one or more non-transitory computer-readable storage media as recited in claim 14, further comprising additional program instructions that, when executed on or across the one or more processors, perform:

determining, by the one or more processors, a discrete set of data points in the time range based at least in part on the continuous function.

* * * * *